(12) United States Patent
Uzelac et al.

(10) Patent No.: US 8,914,254 B2
(45) Date of Patent: Dec. 16, 2014

(54) LATENCY MEASUREMENT

(75) Inventors: Aleksandar Uzelac, Seattle, WA (US); David A. Stevens, Sammamish, WA (US); Andrey B. Batchvarov, Redmond, WA (US); Changsin Lee, Redmond, WA (US); Takahiro Shigemitsu, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 462 days.

(21) Appl. No.: 13/362,238

(22) Filed: Jan. 31, 2012

(65) Prior Publication Data
US 2013/0197862 A1    Aug. 1, 2013

(51) Int. Cl.
| G06F 11/30 | (2006.01) |
| G21C 17/00 | (2006.01) |
| G06F 3/041 | (2006.01) |
| G06F 3/043 | (2006.01) |

(52) U.S. Cl.
USPC ............................ 702/186; 345/173; 345/177

(58) Field of Classification Search
USPC ................................... 702/186; 345/173, 177
See application file for complete search history.

(56) References Cited

U.S. PATENT DOCUMENTS

| 4,421,997 | A | 12/1983 | Forys |
| 5,493,294 | A | 2/1996 | Morita |
| 5,825,352 | A | 10/1998 | Bisset et al. |
| 5,856,822 | A | 1/1999 | Du et al. |
| 5,943,043 | A | 8/1999 | Furuhata et al. |
| 6,008,636 | A | 12/1999 | Miller et al. |
| 6,091,406 | A | 7/2000 | Kambara et al. |
| 6,323,846 | B1 | 11/2001 | Westerman et al. |
| 6,671,406 | B1 | 12/2003 | Anderson |
| 6,741,237 | B1 | 5/2004 | Benard et al. |
| 6,856,259 | B1 | 2/2005 | Sharp |
| 6,977,646 | B1 | 12/2005 | Hauck et al. |
| 7,053,887 | B2 | 5/2006 | Kraus et al. |
| 7,174,649 | B1 | 2/2007 | Harris |
| 7,254,775 | B2 | 8/2007 | Geaghan et al. |
| 7,295,191 | B2 | 11/2007 | Kraus et al. |
| 7,362,313 | B2 | 4/2008 | Geaghan et al. |
| 7,375,454 | B2 | 5/2008 | Takasaki |

(Continued)

FOREIGN PATENT DOCUMENTS

| CN | 1761932 | 4/2006 |
| CN | 1942853 | 4/2007 |

(Continued)

OTHER PUBLICATIONS

"International Search Report and Written Opinion", Application No. PCT/US2013/046208, Sep. 27, 2013, 12 pages.

(Continued)

*Primary Examiner* — John Breene
*Assistant Examiner* — Manuel Rivera Vargas
(74) *Attorney, Agent, or Firm* — Timothy Churna; Kate Drakos; Micky Minhas

(57) ABSTRACT

Panning latency measurement techniques are described. In one or more implementations, a test apparatus includes one or more motors configured to move one or more contacts at least proximal to one or more sensors of a device to be detectable as a movement. The test apparatus also includes one or more modules implemented at least partially in hardware to measure latency of the device to recognize the movement of the one or more contacts.

20 Claims, 6 Drawing Sheets

(56) References Cited

U.S. PATENT DOCUMENTS

| | | |
|---|---|---|
| 7,489,303 B1 | 2/2009 | Pryor |
| 7,580,556 B2 | 8/2009 | Lee et al. |
| 7,592,999 B2 | 9/2009 | Rosenberg et al. |
| 7,619,618 B2 | 11/2009 | Westerman et al. |
| 7,711,450 B2 | 5/2010 | Im et al. |
| 7,725,014 B2 | 5/2010 | Lam et al. |
| 7,728,821 B2 | 6/2010 | Hillis et al. |
| 7,746,325 B2 | 6/2010 | Roberts |
| 7,797,115 B2 | 9/2010 | Tasher et al. |
| 7,812,828 B2 | 10/2010 | Westerman et al. |
| 7,907,750 B2 | 3/2011 | Ariyur et al. |
| 7,938,009 B2 | 5/2011 | Grant et al. |
| 7,978,182 B2 | 7/2011 | Ording et al. |
| 8,061,223 B2 | 11/2011 | Pan |
| 8,217,909 B2 | 7/2012 | Young |
| 8,280,119 B2 | 10/2012 | Hamza |
| 8,314,780 B2 | 11/2012 | Lin et al. |
| 8,493,355 B2 | 7/2013 | Geaghan et al. |
| 8,725,443 B2 | 5/2014 | Uzelac et al. |
| 8,773,377 B2 | 7/2014 | Zhao et al. |
| 2003/0164820 A1 | 9/2003 | Kent |
| 2004/0207606 A1 | 10/2004 | Atwood et al. |
| 2005/0012724 A1 | 1/2005 | Kent |
| 2005/0063566 A1 | 3/2005 | Beek et al. |
| 2006/0097991 A1 | 5/2006 | Hotelling et al. |
| 2006/0175485 A1 | 8/2006 | Cramer |
| 2006/0227120 A1 | 10/2006 | Eikman |
| 2007/0081726 A1 | 4/2007 | Westerman et al. |
| 2008/0041639 A1 | 2/2008 | Westerman et al. |
| 2008/0062140 A1 | 3/2008 | Hotelling et al. |
| 2008/0068229 A1 | 3/2008 | Chuang |
| 2008/0150909 A1 | 6/2008 | North et al. |
| 2008/0158185 A1 | 7/2008 | Westerman |
| 2008/0180399 A1 | 7/2008 | Cheng |
| 2008/0211778 A1 | 9/2008 | Ording et al. |
| 2008/0211782 A1 | 9/2008 | Geaghan et al. |
| 2008/0252616 A1 | 10/2008 | Chen |
| 2008/0278453 A1 | 11/2008 | Reynolds et al. |
| 2008/0284899 A1 | 11/2008 | Haubmann et al. |
| 2008/0309624 A1 | 12/2008 | Hotelling |
| 2008/0309629 A1 | 12/2008 | Westerman et al. |
| 2009/0009483 A1 | 1/2009 | Hotelling et al. |
| 2009/0046073 A1 | 2/2009 | Pennington et al. |
| 2009/0096753 A1 | 4/2009 | Lim |
| 2009/0141046 A1 | 6/2009 | Rathnam et al. |
| 2009/0157206 A1 | 6/2009 | Weinberg et al. |
| 2009/0160763 A1 | 6/2009 | Cauwels et al. |
| 2009/0174679 A1 | 7/2009 | Westerman |
| 2009/0190399 A1 | 7/2009 | Shibata et al. |
| 2009/0225036 A1 | 9/2009 | Wright |
| 2009/0241701 A1 | 10/2009 | Pan |
| 2009/0250268 A1 | 10/2009 | Staton et al. |
| 2009/0251435 A1 | 10/2009 | Westerman et al. |
| 2009/0251436 A1 | 10/2009 | Keskin |
| 2009/0267903 A1 | 10/2009 | Cady et al. |
| 2009/0273584 A1 | 11/2009 | Staton et al. |
| 2009/0303202 A1 | 12/2009 | Liu |
| 2009/0312009 A1 | 12/2009 | Fishel |
| 2010/0053099 A1 | 3/2010 | Vincent et al. |
| 2010/0060604 A1 | 3/2010 | Zwart et al. |
| 2010/0073318 A1 | 3/2010 | Hu et al. |
| 2010/0103118 A1 | 4/2010 | Townsend et al. |
| 2010/0103121 A1 | 4/2010 | Kim et al. |
| 2010/0117962 A1 | 5/2010 | Westernan et al. |
| 2010/0134429 A1 | 6/2010 | You et al. |
| 2010/0142765 A1 | 6/2010 | Hamza |
| 2010/0193258 A1 | 8/2010 | Simmons et al. |
| 2010/0214233 A1 | 8/2010 | Lee |
| 2010/0231508 A1 | 9/2010 | Cruz-Hernandez et al. |
| 2010/0277505 A1 | 11/2010 | Ludden et al. |
| 2010/0302211 A1 | 12/2010 | Huang |
| 2010/0309139 A1 | 12/2010 | Ng |
| 2010/0315266 A1 | 12/2010 | Gunawardana et al. |
| 2010/0315366 A1 | 12/2010 | Lee et al. |
| 2010/0315372 A1 | 12/2010 | Ng |
| 2011/0001633 A1 | 1/2011 | Lam et al. |
| 2011/0018822 A1 | 1/2011 | Lin et al. |
| 2011/0025629 A1 | 2/2011 | Grivna et al. |
| 2011/0042126 A1 | 2/2011 | Spaid et al. |
| 2011/0050620 A1 | 3/2011 | Hristov |
| 2011/0080348 A1 | 4/2011 | Lin et al. |
| 2011/0084929 A1 | 4/2011 | Chang et al. |
| 2011/0106477 A1 | 5/2011 | Brunner |
| 2011/0115709 A1 | 5/2011 | Cruz-Hernandez |
| 2011/0115747 A1 | 5/2011 | Powell et al. |
| 2011/0141054 A1 | 6/2011 | Wu |
| 2011/0242001 A1 | 10/2011 | Zhang et al. |
| 2011/0248941 A1 | 10/2011 | Abdo et al. |
| 2011/0261005 A1 | 10/2011 | Joharapurkar et al. |
| 2011/0267481 A1 | 11/2011 | Kagei |
| 2011/0298709 A1 | 12/2011 | Vaganov |
| 2011/0298745 A1 | 12/2011 | Souchkov |
| 2011/0299734 A1 | 12/2011 | Bodenmueller |
| 2011/0304577 A1 | 12/2011 | Brown |
| 2011/0304590 A1 | 12/2011 | Su et al. |
| 2012/0030624 A1 | 2/2012 | Migos |
| 2012/0032891 A1 | 2/2012 | Parivar |
| 2012/0065779 A1 | 3/2012 | Yamaguchi et al. |
| 2012/0065780 A1 | 3/2012 | Yamaguchi et al. |
| 2012/0068957 A1 | 3/2012 | Puskarich et al. |
| 2012/0075331 A1 | 3/2012 | Mallick |
| 2012/0105334 A1 | 5/2012 | Aumiller et al. |
| 2012/0131490 A1 | 5/2012 | Lin et al. |
| 2012/0146956 A1 | 6/2012 | Jenkinson |
| 2012/0153652 A1 | 6/2012 | Yamaguchi et al. |
| 2012/0187956 A1* | 7/2012 | Uzelac et al. ............... 324/537 |
| 2012/0188176 A1* | 7/2012 | Uzelac et al. ............... 345/173 |
| 2012/0188197 A1 | 7/2012 | Uzelac |
| 2012/0191394 A1 | 7/2012 | Uzelac |
| 2012/0206377 A1 | 8/2012 | Zhao |
| 2012/0206380 A1 | 8/2012 | Zhao |
| 2012/0223894 A1 | 9/2012 | Zhao |
| 2012/0268416 A1 | 10/2012 | Pirogov et al. |
| 2012/0280934 A1* | 11/2012 | Ha et al. ............... 345/174 |
| 2012/0280946 A1 | 11/2012 | Shih et al. |
| 2012/0301009 A1 | 11/2012 | Dabic |
| 2012/0319992 A1 | 12/2012 | Lee |
| 2013/0016045 A1 | 1/2013 | Zhao |
| 2013/0063167 A1 | 3/2013 | Jonsson |
| 2013/0113751 A1 | 5/2013 | Uzelac et al. |
| 2013/0238129 A1 | 9/2013 | Rose et al. |
| 2013/0345864 A1 | 12/2013 | Park |
| 2014/0081793 A1 | 3/2014 | Hoffberg |

FOREIGN PATENT DOCUMENTS

| | | |
|---|---|---|
| CN | 200947594 | 9/2007 |
| CN | 101553777 | 10/2009 |
| CN | 101661373 | 3/2010 |
| CN | 101937296 | 1/2011 |
| CN | 201828476 | 5/2011 |
| CN | 2201903594 | 7/2011 |
| CN | 202093112 | 12/2011 |
| CN | 101545938 | 1/2012 |
| CN | 202171626 | 3/2012 |
| CN | 202196126 | 4/2012 |
| CN | 102436334 | 5/2012 |
| CN | 101982783 | 7/2012 |
| DE | 19939159 | 3/2000 |
| EP | 2077490 | 7/2009 |
| EP | 2284654 | 2/2011 |
| JP | 2003-303051 A | 10/2003 |
| JP | 2007323731 | 12/2007 |
| KR | 20050003155 | 1/2005 |
| KR | 10-2005-0094359 A | 9/2005 |
| KR | 10-0763057 B1 | 10/2007 |
| KR | 20080066416 | 7/2008 |
| KR | 100941441 | 2/2010 |
| KR | 20100067178 | 6/2010 |
| KR | 10-2010-0077298 A | 7/2010 |
| KR | 20100129015 | 12/2010 |
| KR | 10-1007049 B1 | 1/2011 |
| KR | 20110011337 | 2/2011 |
| KR | 10-1065014 B1 | 9/2011 |

(56) References Cited

FOREIGN PATENT DOCUMENTS

| WO | WO-9938149 | 7/1999 |
|---|---|---|
| WO | WO-2005114369 | 12/2005 |
| WO | WO-2006042309 | 4/2006 |
| WO | WO-2010073329 | 7/2010 |
| WO | WO-2013063042 | 5/2013 |

OTHER PUBLICATIONS

"Non-Final Office Action", U.S. Appl. No. 13/099,288, Feb. 6, 2014, 13 pages.

"Non-Final Office Action", U.S. Appl. No. 13/198,036, Jan. 31, 2014, 14 pages.

"Non-Final Office Action", U.S. Appl. No. 13/154,161, Jan. 3, 2014, 14 pages.

"Non-Final Office Action", U.S. Appl. No. 12/941,693, Nov. 18, 2013, 21 Pages.

"Notice of Allowance", U.S. Appl. No. 13/156,243, Jan. 28, 2014, 8 pages.

"Notice of Allowance", U.S. Appl. No. 13/198,415, Dec. 26, 2013, 8 pages.

"Final Office Action", U.S. Appl. No. 13/154,161, Apr. 22, 2014, 16 pages.

"Final Office Action", U.S. Appl. No. 13/530,692, Apr. 10, 2014, 16 pages.

"Foreign Office Action", CN Application No. 201210018527.8, Feb. 24, 2014, 10 Pages.

"Foreign Office Action", CN Application No. 201210029859.6, Feb. 21, 2014, 15 Pages.

"International Search Report and Written Opinion", Application No. PCT/US2013/061067, Feb. 7, 2014, 11 pages.

"Non-Final Office Action", U.S. Appl. No. 13/152,991, Mar. 21, 2014, 18 pages.

"Non-Final Office Action", U.S. Appl. No. 13/183,377, Feb. 27, 2014, 12 pages.

"Non-Final Office Action", U.S. Appl. No. 13/530,692, Jan. 31, 2014, 14 pages.

"Actuation Force of Touch Screen", *Solutions @ Mecmesin*, retrieved from <http://www.ArticleOnePartners.com/index/servefile?fileId=188971>,(Dec. 31, 2010),1 page.

"AO Touch Screen Tester", retrieved from <http://www.ao-cs.com/Projects/touch%20screen%20tester%20project.html>, (Dec. 31, 2010),1 page.

"Capacitive Touch Sensors—Application Fields, Technology Overview and Implementation Example", *Fujitsu Microelectronics Europe GmbH*; retrieved from http://www.fujitsu.com/downloads/MICRO/fme/articles/fujitsu-whitepaper-capacitive-touch-sensors.pdf on Jul. 20, 2011, (Jan. 12, 2010),12 pages.

"Final Office Action", U.S. Appl. No. 12/941,693, (Nov. 26, 2012), 22 Pages.

"Haptic-Actuator Controllers", retrieved from <http://www.maxim-ic.com/products/data_converters/touch-interface/haptic-actuator.cfm> on May 4, 2011, 1 page.

"How to Use the Precision Touch Testing Tool", retrieved from <http://feishare.com/attachments/article/279/precision-touch-testing-tool-Windows8-hardware-certification.pdf>, (Apr. 15, 2012),10 pages.

"International Search Report", Application No. PCT/US2011/058855, (Nov. 1, 2011), 8 pages.

"Linearity Testing Solutions in Touch Panels", retrieved from <advantech.com/machine-automation/.../%7BD05BC586-74DD-4BFA-B81A-2A9F7ED489F/>, (Nov. 15, 2011), 2 pages.

"MAX11871", retrieved from <http://www.maxim-ic.com/datasheet/index.mvp/id/7203> on May 4, 2011, 2 pages.

"MicroNav Integration Guide Version 3.0", retrieved from <http://www.steadlands.com/data/interlink/micronavintguide.pdf>, (Dec. 31, 2003),11 pages.

"Microsoft Windows Simulator Touch Emulation", retrieved from <blogs.msdn.com/b/visualstudio/archive/2011/09/30/microsoft-windows-simulator-touch-emulation.aspx>, (Sep. 30, 2011), 3 pages.

"Non-Final Office Action", U.S. Appl. No. 12/941,693, (Jul. 18, 2012), 19 pages.

"Non-Final Office Action", U.S. Appl. No. 13/152,991, (Mar. 21, 2013), 10 pages.

"OptoFidelity Touch & Test", retrieved from <http://www.ArticleOnePartners.com/index/servefile?fileId=188969, (Feb. 20, 2012), 2 pages.

"OptoFidelity Touch and Test", retrieved from <http://www.ArticleOnePartners.com/index.servefile?fileId=188420>, (May 4, 2012), 2 pages.

"OptoFidelity Two Fingers—robot", video available at <http://www.youtube.com/watch?v=YppRASbXHfk&feature=player_embedded#!section>, (Sep. 15, 2010), 2 pages.

"PCT Search Report and Written Opinion", Application No. PCT/US2011/055621, (Jun. 13, 2012), 8 pages.

"PCT Search Report and Written Opinion", Application No. PCT/US2012/027642, (Sep. 3, 2012), 9 pages.

"PCT Search Report and Written Opinion", Application No. PCT/US2012/024780, (Sep. 3, 2012), 9 pages.

"PCT Search Report and Written Opinion", Application No. PCT/US2012/024781, (Sep. 3, 2012), 9 pages.

"Projected Capacitive Test Fixture", retrieved from <http://www.touch-intl.com/downloads/DataSheets%20for%20Web/6500443-PCT-DataSheet-Web.pdf>, (2009), 2 pages.

"Resistive Touch Screen_Resistance Linearity Test", video available at <http://www.youtube.com/watch?v=hb23GpQdXXU>, (Jun. 17, 2008), 2 pages.

"Smartphone Automatic Testing Robot at UEI Booth"video available at <http://www.youtube.com/watch?v=f-Q4ns-b9sA>, (May 9, 2012), 2 pages.

"Technology Comparison: Surface Acoustic Wave, Optical and Bending Wave Technology", *3M Touch Systems*, Available at >http://multimedia.3m.com/mws/mediawebserver?mwsId=66666UuZjcFSLXTtnXT2NXTaEVuQEcuZgVs6EVs6E666666--&fn=DST-Optical-SAW%20Tech%20Brief.pdf>,(2009), pp. 1-4.

"Touch Panel Inspection & Testing Solution", retrieved from <http://www.ArticleOnePartners.com/index/servefile?fileId=188967>, (Dec. 31, 2010),1 page.

"Touch Panel Semi-Auto Handler Model 3810", retrieved from <http://www.chromaus.com/datasheet/3810_en.pdf>, (Dec. 31, 2010), 2 pages.

"TouchSense Systems Immersion", retrieved from <http://www.ArticleOnePartners.com/index/servefile?fileId=188486>, (Jun. 19, 2010), 20 pages.

"Using Low Power Mode on the MPR083 and MPR084", *Freescale Semiconductor Application Note*, Available at <http://cache.freescale.com/files/sensors/doc/app_note/AN3583.pdf>, (Nov. 2007), pp. 1-5.

Baraldi, Stefano et al., "WikiTable: Finger Driven Interaction for Collaborative Knowledge-Building Workspaces", *Proceedings of the 2006 Conference on Computer Vision and Pattern Recognition Workshop (CVPRW '06)*, available at <<http://ieeexplore.ieee.org/stamp/stamp.jsp?tp=&arnumber=1640590>>,(Jul. 5, 2006), 6 pages.

Benko, Hrvoje et al. "Resolving Merged Touch Contacts", U.S. Appl. No. 12/914,693, filed Nov. 8, 2012, 22 pages.

Binns, Francis S., "Multi-"Touch" Interaction via Visual Tracking", *Bachelor of Science in Computer Science with Honours*, The University of Bath, available at <<http://www.cs.bath.ac.uk/~mdv/courses/CM30082/projects.bho/2008-9/Binns-FS-dissertation-2008-9.pdf>>,(May 2009) 81 pages.

Brodkin, Jon "Windows 8 hardware: Touchscreens, sensor support and robotic fingers", <<http://arstechnica.com/business/news/2011/09/windows-8-hardware-touch-screens-sensor-support-and-robotic-fingers.ars>>, (Sep. 13, 2011),1 Page.

Buffet, Y "Robot Touchscreen Analysis", <<http://ybuffet.posterous.com/labsmotocom-blog-archive-robot-touchscreen-an>>, (Apr. 19, 2010), 2 Pages.

Cao, Xiang et al., "Evaluation of an On-line Adaptive Gesture Interface with Command Prediction", *In proceedings of GI 2005*, Available at <http://citeseerx.ist.psu.edu/viewdoc/download;jsessionid=DAB1B08F620C23464427932BAF1ECF49?doi=10.1.1.61.6749&rep=rep1&type=pdf>,(May 2005), 8 pages.

(56) References Cited

OTHER PUBLICATIONS

Cao, Xiang et al., "ShapeTouch: Leveraging Contact Shape on Interactive Surfaces", *In Proceedings of Tabletop 2008*, Available at <http://www.cs.toronto.edu/~caox/tabletop2008_shapetouch.pdf>,(2008),pp. 139-146.

Cavotta, Robert "The Battle for Multi-touch", *Embedded Insights*, retrieved from <http://www.embeddedinsights.com/channels/2011/04/12/the-battle-for-multi-touch/> on May 4, 2011,(Apr. 12, 2011), 3 pages.

Dang, Chi T., et al., "Hand Distinction for Multi-Touch Tabletop Interaction", University of Augsburg; Institute of Computer Science: *Proceedings of the ACM International Conference on Interactive Tabletops and Surfaces*, (Nov. 23-25, 2009), 8 pages.

Dillencourt, Michael B., et al., "A General Approach to Connected-Component Labeling for Arbitrary Image Representations", *Journal of the Association for Computing Machinery*, vol. 39, No. 2, available at <<http://www.cs.umd.edu/~hjs/pubs/DillJACM92.pdf>>,(Apr. 1992), pp. 253-280.

Dillow, Clay "Liquid-Filled Robot Finger More Sensitive to Touch Than a Human's", retrieved from <www.popsci.com/technoloqy/article/2012-06/new-robot-finger-more-sensitive-touch-human> on Jul. 27, 2012, (Jun. 19, 2012), 3 pages.

Hoggan, Eve et al. "Mobile Multi-Actuator Tactile Displays", *In 2nd international conference on Haptic and audio interaction design*, retrieved from <http://www.dcs.gla.ac.uk/~stephen/papers/HAID2.pdf>,(Oct. 29, 2007), 12 pages.

Hoshino, et al., "Pinching at finger tips for humanoid robot hand", Retrieved at <<http://web.mit.edu/zoz/Public/HoshinoKawabuchiRobotHand.pdf>>, (Jun. 30, 2005), 9 Pages.

Kastelan, et al., "Stimulation Board for Automated Verification of Touchscreen-Based Devices", *22nd International Conference on Field Programmable Logic and Applications*, Available at <https://www2.lirmm.fr/lirmm/interne/BIBLI/CDROM/MIC/2012/FPL_2012/Papers/PHD7.pdf>,(Aug. 29, 2012), at 2 pages.

Kastelan, et al., "Touch-Screen Stimulation for Automated Verification of Touchscreen-Based Devices", *In IEEE 19th International Conference and Workshops on Engineering of Computer Based Systems*, (Apr. 11, 2012), pp. 52-55.

Khandkar, Shahedul H., et al., "Tool Support for Testing Complex MultiTouch Gestures", *ITS 2010*, Nov. 7-10, 2010, Saarbrucken, Germany, (Nov. 7, 2010), 10 pages.

Kjellgren, Olof "Developing a remote control application for Windows CE", Bachelor Thesis performed in Computer Engineering at ABE Robotics, Miilardalen University, *Department of Computer Science and Electronics*, Retrieved at <<http://www.idt.mdh.se/utbildning/exjobblfiles/TR0661.pdf>>,(May 30, 2007), 43 Pages.

Kuosmanen, Hans "OptoFidelity Automating UI Testing", video available at <http://www.youtube.com/watch?v=mOZ2r7ZvyTg&feature=player_embedded#!section>, (Oct. 14, 2010), 2 pages.

Kuosmanen, Hans "Testing the Performance of Touch-Enabled Smartphone User Interfaces", retrieved from <http://www.ArticleOnePartners.com/index/servefile?fileId=188442>, (Dec. 31, 2008), 2 pages.

Levin, Michael et al., "Tactile-Feedback Solutions for an Enhanced User Experience", retrieved from >http://www.pbinterfaces.com/documents/Tactile_Feedback_Solutions.pdf>, (Oct. 31, 2009), pp. 18-21.

McGlaun, Shane "Microsoft's Surface 2.0 Stress Testing Robot Called Patty Shown off for First Time", Retrieved at <<http://www.slashgear.com/microsofts-surface-2-0-stress-testing-robot-called-patty-shown-off-for-first-time-19172971/>>, (Aug. 19, 2011), 1 Page.

McMahan, William et al., "Haptic Display of Realistic Tool Contact via Dynamically Compensated Control of a Dedicated Actuator", *International Conference on Intelligent Robots and Systems*, St. Louis, MO, Oct. 11-15, 2009, retrieved from <http://repository.upenn.edu/meam_papers/222>,(Dec. 15, 2009), 9 pages.

Pratt, Susan "Factors Affecting Sensor Response", *Analog Devices, AN-830 Application Note*, Available at <http://www.analog.com/static/imported-files/application_notes/52957377291382187 42AN830_0.pdf>,(Dec. 2005), pp. 1-8.

Takeuchi, et al., "Development of a Muti-fingered Robot Hand with Softness changeable Skin Mechanism", *International Symposium on and 2010 6th German Conference on Robotics (ROBOTIK)*, Retrieved at <<http://ieeexplore.ieee.org/stamp/stamp.jsp?arnumber=05756853>>,(Jun. 7, 2010), 7 Pages.

Tao, Yufei et al., "An Efficient Cost Model for Optimization of Nearest Neighbor Search in Low and Medium Dimensional Spaces", *Knowledge and Data Engineering*, vol. 16 Issue:10, retrieved from <<http://www.cais.ntu.edu.sg/~jzhang/papers/ecmonns.pdf>> on Mar. 16, 2011,(Oct. 2004), 16 pages.

Terpstra, Brett "BetterTouchTool Makes Multi-touch Infinitely More Useful, for Free", retrieved from <http://www.tuaw.com/2010/01/05/bettertouchtool-makes-multi-touch-infinitely-more-useful-for-fr/> on Jul. 20, 2012, (Jan. 5, 2010), 4 pages.

Toto, Serkan "Video: Smartphone Test Robot Simulates Countless Flicking and Tapping", retrieved from <techcrunch.com/2010/12/21/video-smartphone-test-robot-simulates-countless-flicking-and-tapping/>, (Dec. 21, 2010), 2 pages.

Tsuchiya, Sho et al., "Vib-Touch: Virtual Active Touch Interface for Handheld Devices", *In Proceedings of the 18th IEEE International Symposium on Robot and Human Interactive Communication*, Available at <http://www.mech.nagoya-u.ac.jp/asi/en/member/shogo_okamoto/papers/tsuchiyaROMAN2009.pdf>,(Oct. 2009), pp. 12-17.

Westman, Tapani et al., "Color Segmentation by Hierarchical Connected Components Analysis with Image Enhancement by Symmetric Neighborhood Filter", Pattern Recognition, 1990. Proceedings., *10th International Conference* on Jun. 16-21, 1990, retrieved from <<http://ieeexplore.ieee.org/stamp/stamp.jsp?tp=&arnumber=118219>> on Mar. 16, 2011,(Jun. 16, 1990), pp. 796-802.

Wilson, Andrew D., "TouchLight: An Imaging Touch Screen and Display for Gesture-Based Interaction", *In Proceedings of ICM 2004*, Available at <http://citeseerx.ist.psu.edu/viewdoc/download-?doi=10.1.1.95.3647&rep=rep1&type=pdf>,(Oct. 2004), 8 pages.

Wimmer, Raphael et al., "Modular and Deformable Touch-Sensitive Surfaces Based on Time Domain Reflectometry", *In Proceedings of UIST 2011*, Available at <http://www.medien.ifi.lmu.de/pubdb/publications/pub/wimmer2011tdrTouch/wimmer2011tdrTouch.pdf>,(Oct. 2011), 10 pages.

Zivkov, et al., "Touch Screen Mobile Application as Part of Testing and Verification System", *Proceedings of the 35th International Convention*, (May 21, 2012), pp. 892-895.

"Corrected Notice of Allowance", U.S. Appl. No. 13/156,243, Jun. 6, 2014, 4 pages.

"Foreign Office Action", CN Application No. 201210031164.1, Mar. 5, 2014, 14 Pages.

"Non-Final Office Action", U.S. Appl. No. 13/099,288, Jun. 10, 2014, 22 pages.

"Restriction Requirement", U.S. Appl. No. 13/205,319, May 8, 2014, 6 pages.

"International Search Report", Mailed Date: May 13, 2013, Application No. PCT/US2013/021787, Filed Date: Jan. 17, 2013, pp. 9.

Asif, et al., "MPEG-7 Motion Descriptor Extraction for Panning Camera Using Sprite Generated", Retrieved at <<http://ieeexplore.iee.org/stamp/stamp.jsp?tp=&arnumber=473384>>, In the proceedings of AVSS '08 Proceedings of the 2008 IEEE Fifth International Conference on Advanced Video and Signal Based Surveillance, Sep. 1, 2008, pp. 60-66.

"STM23S-2AN NEMA 23 Integrated Drive+Motor", Retrieved at <<http://www.applied-motion.com/products/integrated-steppers/stm23s-2an>> Jan. 24, 2012, pp. 3.

"Final Office Action", U.S. Appl. No. 13/152,991, (Sep. 20, 2013), 14 pages.

"Final Office Action", U.S. Appl. No. 13/183,377, (Oct. 15, 2013), 12 pages.

"Final Office Action", U.S. Appl. No. 13/293,060, (Sep. 25, 2013), 10 pages.

"Non-Final Office Action", U.S. Appl. No. 13/156,243, (Sep. 19, 2013), 12 pages.

(56) References Cited

OTHER PUBLICATIONS

"Non-Final Office Action", U.S. Appl. No. 13/293,060, (Nov. 29, 2013), 11 pages.
"Input Testing Tool", U.S. Appl. No. 13/659,777, filed Oct. 24, 2012, 31 pages.
"Non-Final Office Action", U.S. Appl. No. 12/941,693, (May 16, 2013), 13 pages.
"Non-Final Office Action", U.S. Appl. No. 13/183,377, (Jun. 21, 2013), 10 pages.
"Non-Final Office Action", U.S. Appl. No. 13/293,060, (Jul. 12, 2013), 9 pages.
"Touch Quality Test Robot", U.S. Appl. No. 13/530,692, filed Jun. 22, 2012, 20 pages.
"Foreign Office Action", TW Application No. 101100606, Apr. 15, 2014, 10 pages.
"Non-Final Office Action", U.S. Appl. No. 13/293,060, Jul. 23, 2014, 12 pages.
"Notice of Allowance", U.S. Appl. No. 13/183,377, Jul. 18, 2014, 7 pages.
"Extended European Search Report", EP Application No. 11840170.2, Jul. 16, 2014, 10 pages.
"Final Office Action", U.S. Appl. No. 13/152,991, Aug. 20, 2014, 14 pages.
"Final Office Action", U.S. Appl. No. 13/198,036, Aug. 14, 2014, 17 pages.
"Foreign Notice of Allowance", CN Application No. 201110349777.5, May 28, 2014, 6 pages.
"Foreign Office Action", CN Application No. 201210031164.1, Sep. 11, 2014, 9 Pages.
"Non-Final Office Action", U.S. Appl. No. 13/530,692, Aug. 25, 2014, 18 pages.
"Non-Final Office Action", U.S. Appl. No. 13/205,319, Sep. 9, 2014, 13 pages.
"Notice of Allowance", U.S. Appl. No. 12/941,693, Aug. 13, 2014, 8 pages.
"Notice of Allowance", U.S. Appl. No. 13/099,288, Oct. 28, 2014, 9 pages.

\* cited by examiner

LATENCY MEASUREMENT

BACKGROUND

Display and input techniques utilized by computing devices are ever evolving. For example, initial computing devices were provided with monitors. A user interacted with the computing device by viewing simple text on the monochrome monitor and entering text via a keyboard that could then be viewed on the monitor. Other techniques were then subsequently developed, such as graphical user interfaces and cursor control devices.

Display and input techniques have continued to evolve, such as to sense touch using a touchscreen display of a computing device to recognize gestures. A user, for instance, may interact with a graphical user interface by inputting a gesture using the user's hand that is detected by the touchscreen display or other touch-sensitive device. However, traditional techniques that were utilized to test touchscreen displays and other touch-sensitive devices were often inaccurate and therefore were typically inadequate to test the touchscreen displays as suitable for intended use of the device.

SUMMARY

Panning latency measurement techniques are described. In one or more implementations, a test apparatus includes one or more motors configured to move a contact at least proximal to one or more sensors of a device to be detectable as a movement. The test apparatus also includes one or more modules implemented at least partially in hardware to measure latency of the device to recognize the movement of the contact.

In one or more implementations, data is received by a test apparatus that describes panning movement detected using touch functionality of a device. Latency is measured, by the test apparatus, of the device to recognize the panning movement to initiate one or more operations of the device.

In one or more implementations, a test apparatus includes a contact configured to be disposed proximal to a display device having touchscreen functionality (e.g., sensors configured to detect proximity, including pen sensors), a motor configured to move the contact in a circular path to be detectable by the touchscreen functionality of the device as a panning movement, and one or more modules implemented at least partially in hardware to measure latency of the device to recognize the panning movement of the contact using constant angular velocity. The test apparatus may also be configured to include an interruption module having a photo interrupter circuit configured to detect the contact, which is used at least in part to measure the latency. In another example, the test apparatus may also be configured to include a laser and photo diode which may be used to measure the latency by calibrating velocity of a contact.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Panning continues to become ever more popular as a technique to navigate through a use interface output by a computing device. However, techniques are not available conventionally to accurately measure latency in recognizing movement of a contact and thus the responsiveness of the computing device to perform panning.

Latency measurement techniques are described herein. In one or more implementations, a test apparatus is configured to detect latency of movement (e.g., panning), such as end-to-end latency, hardware latency, and so on of a computing device to perform a pan. This measurement may be performed in a variety of ways. For example, a test apparatus may include a step motor that creates a circular path that may be used to test latency in recognition of movement using constant angular velocity, further discussion of which may be found in relation to FIG. 2. In another example, the test apparatus may utilize leverage interruptions, such as a photo interrupter, to measure latency, an example of which may be found in relation to FIG. 3. In a further example, the test apparatus may leverage a laser and photo diode to measure latency, an example of which may be found in relation to FIG. 4. Although panning latency is described in the following discussion by way of example, it should be apparent that measurement of panning latency may refer to measurement of latency in recognition of movement by a device.

In the following discussion, an example environment is first described that may employ the panning latency measurement techniques described herein. Example procedures are then described which may be performed in the example environment as well as other environments. Consequently, performance of the example procedures is not limited to the example environment and the example environment is not limited to performance of the example procedures.

Example Environment

Figure 1:
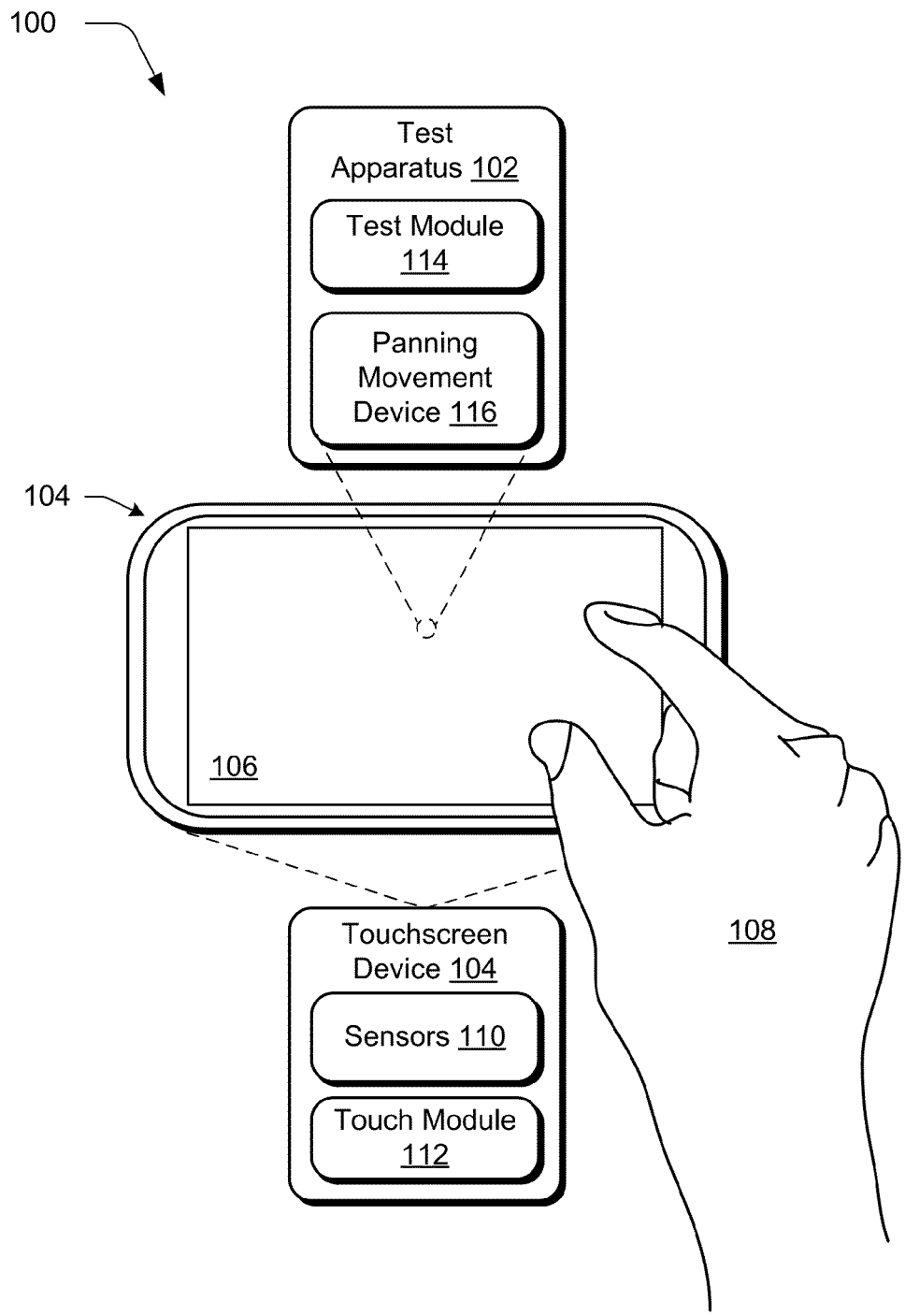
FIG. 1 is an illustration of an environment in an example implementation that includes a test apparatus that is suitable to test a device.

FIG. 1 depicts an environment 100 in an example implementation that includes a test apparatus 102 that is suitable to test a touchscreen device 104. The touchscreen device 104 may be configured in a variety of ways. For example, the touchscreen device 104 may be configured as part of a mobile communication device such as a mobile phone, a portable game-playing device, a tablet computer, as part of a traditional computing device (e.g., a display device that is part of a laptop or personal computer), and so on.

Additionally, the display device 106 of the touchscreen device 104 may be configured in a variety of ways. For example, the display device 106 of the touchscreen device 104 may include sensors that are configured to detect proximity (e.g., contact) with the display device 106. Sensors 110 are typically used to report actual contact with the display device 106, such as when being touched with a finger of a user's hand 108, although other sensors are also described.

Examples of such sensors 110 include capacitive touch sensors. For instance, in projected capacitance an X-Y grid may be formed across the touchscreen using near optically transparent conductors (e.g., indium tin oxide) to detect contact at different X-Y locations on the display device 106. Other capacitance techniques are also contemplated, such as surface capacitance, mutual capacitance, self-capacitance, and so on. Further, other sensors 110 are also contemplated in other instances, such as infrared, optical imaging, dispersive signal technology, acoustic pulse recognition, resistive sensors (e.g., detect pressure), sensor in a pixel, and so on. Thus, a touch sensor 110 may be configured to detect proximity and not actual physical contact, e.g., "hovering" of a stylus.

Regardless of the type of sensors 110 used, inputs detected by the sensors 110 may then be processed by the touch module 112 to detect characteristics of the inputs, which may be used for a variety of purposes. For example, the touch module 112 may recognize that the input indicates selection of a particular object, may recognize one or more inputs as a gesture usable to initiate an operation of the touchscreen device 104 (e.g., expand a user interface), and so forth. However, this processing may rely upon the accuracy of the inputs and therefore conventional techniques that were utilized to test the display device 106 could result in an inaccurate touchscreen making it to market, which could hinder a user's interaction with the device.

In one or more implementations described herein, an ability of a display device 106 to detect proximity (e.g., by a finger of a user's hand 108) is tested by the test apparatus 102. For example, the test apparatus 102 may include a test module 114 and panning movement device 116. The panning movement device 116 may be utilized to test the touchscreen device 104 in a variety of ways. For instance, the test module 114 may leverage the panning movement device 116 to measure panning latency of the touchscreen device 104, such as an ability of the touch module 112 to detect contact by one or more fingers of the user's hand 108 (or other objects) with the display device 106 and subsequent movement of this contact. This may be performed in a variety of ways, an example of which may be found in relation to FIG. 2.

Example Panning Latency Measurement Using a Moving Contact

Figure 2:
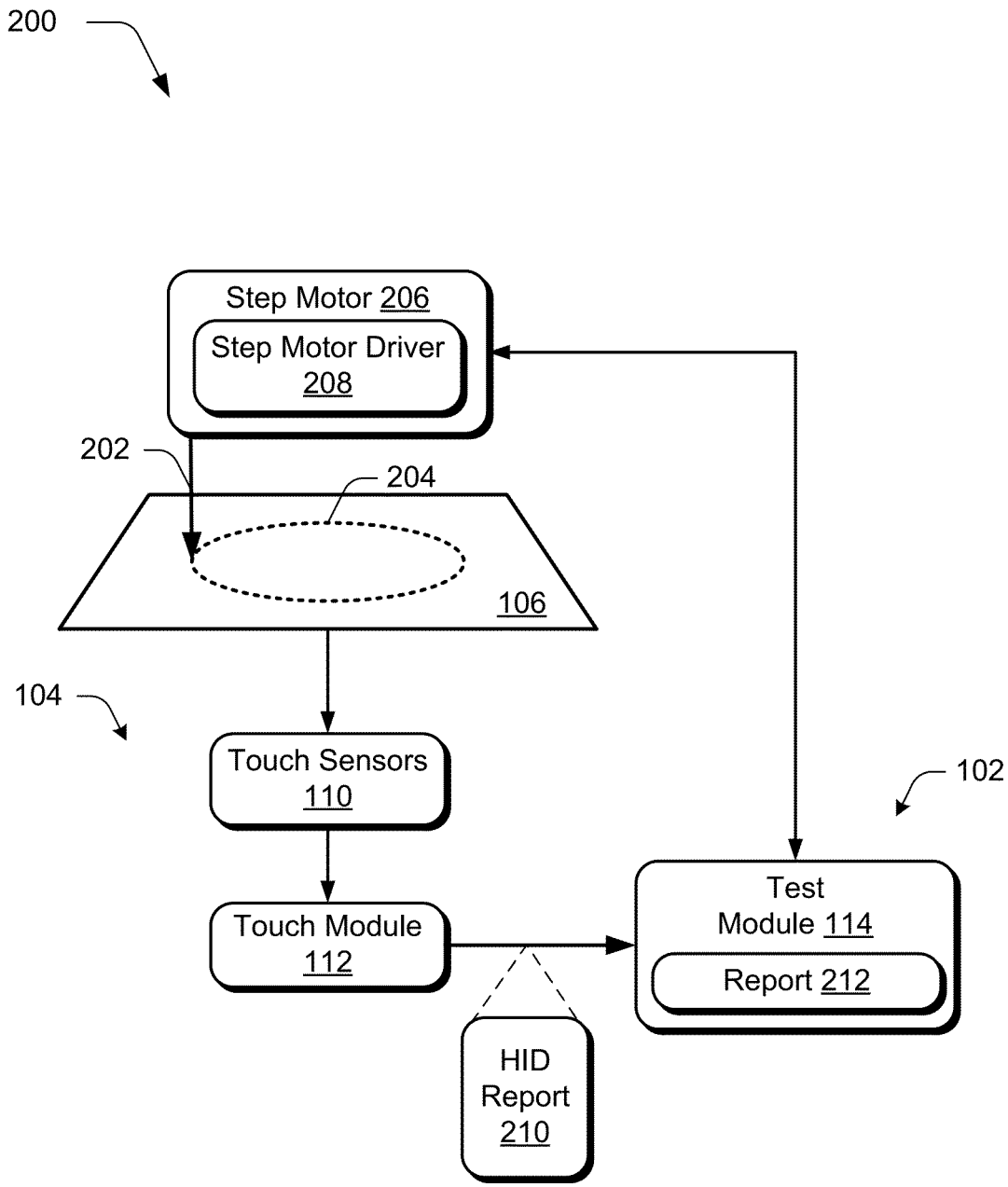
FIG. 2 depicts an example implementation of a system configured to test panning latency.

FIG. 2 depicts an example implementation of a system 200 configured to test panning latency. Panning latency may be used to evaluate sensors 110 and a touch module 112 of a touchscreen device 104 to detect a panning input, which may involve contact with the touchscreen and subsequent movement of the contact. In the illustrated example system, a contact 202 and subsequent movement along a path 204 is provided by a step motor 206 and step motor driver 208, which may be under the control of the test module 114 of FIG. 1. As previously stated, the contact 202 may be detected by being disposed proximal to sensors of a device under test and therefore may not involve actual contact in some instances. Further, although a single contact 202 is illustrated, these techniques may also be leveraged to support multiple contacts, such as to support multi-touch testing. In the illustrated example, the path 204 is circular although other shapes including linear (e.g., back and forth movement) are also contemplated. Detection of the path by the sensors 110 and subsequent processing by the touch module 112 is used to generate an HID report 210 that is evaluated by the test module 114 to generate a report that describes panning latency.

Panning may be involved in a variety of different scenarios, such as scrolling in browser, use in a tile-based user interface, and so on. In one or more of these scenarios, a "stick to the finger" experience may be desired in which an end user instantaneously receives feedback from a display device 106 in response to moving of a contact 202 on the display device 106. The quality of this experience may be quantified as an end-to-end latency for panning scenarios, which may be defined as follows.

Latency is a measure of time delay experienced in a system. In the case of end-to-end panning latency, a continuous system is encountered such that the entire process of panning is not instantaneous, but instead takes some time, generally on an order of magnitude involving seconds. Hence, latency may be defined to measure this. A contact 202 of a test apparatus 102, that initiates the panning gesture may be accurately modeled with a contact position in time function as follows:

$$\text{Contact}(t){:}(t) \rightarrow (x,y)$$

Therefore, for each moment in time the position of the contact 202 is also determined. However, digitizers and other sensors 110 typically do not provide continuous reporting, but instead report discretely and with some predefined reporting rate (e.g., 100-200 reports per second, 100-200 Hz). If the reporting rate was infinite, the reported position in time function may be represented as follows:

$$\text{Report}(t){:}(t) \rightarrow (x,y)$$

Similar to this, an ideal case may be established for display device 106 feedback which includes the graphics latency (e.g., of an operating system) along with a position of the display feedback in time function:

$$\text{Display}(t){:}(t) \rightarrow (x,y)$$

For the purposes of this abstract modeling, the contact 202 position's path 204 may be assumed to be the same as report position path which is the same as display position path. In practice, however, this may not be the case as further addressed later in the discussion. Furthermore, an assumption may be made that each of the three functions above are bijective, which although not the case it may be achieved through piece-wise modeling. This may involve a process of dividing an entire function in several pieces, each of which is bijective. With those two assumptions, a latency function may be built for each position along the path (e.g., the path is the same for each of the three functions per first assumption above) by measuring time difference between display by the display device and contact function for each position along the path, per the second assumption a single timestamp is provided that corresponds to each position in the path for each of the three functions.

Accordingly, a formal model for this definition of latency may be created. This creation of the formal model may begin with three inverse functions as follows:

(1) for time of the given contact position: $\text{Contact}^{-1}(x,y){:}(x,y) \rightarrow (t)$;

(2) for time of the given report position; $\text{Report}^{-1}(x,y){:}(x,y) \rightarrow (t)$; and (3) for time of the given display feedback position, $$\text{Display}^{-1}(x,y){:}(x,y) \rightarrow (t)$$

Given those inverse functions, an end-to-end latency function may be defined for each position on the path as follows, in which:

$$\text{Latency}(x,y):(x,t) \to (t)$$

as $$\text{Latency}(x,y)=\text{Display}^{-1}(x,y)-\text{Contact}^{-1}(x,y)$$

For example, consider fixed point (x0, y0), and appropriate inverse display function for that particular point:

$$t_D=t_D(x_0,y_0)=\text{Display}^{-1}(x_0,y_0)$$

and similar for contact inverse function for this particular point as follows:

$$t_C=t_C(x_0,y_0)=\text{Contact}^{-1}(x_0,y_0)$$

In that case, the end-to-end latency for this particular point may be calculated as follows:

$$\text{Latency}(x_0,y_0)=t_D(x_0,y_0)-t_C(x_0,y_0)=t_D-t_C$$

This expression describes a difference in time between when the contact occurred at given position (x0, y0) and the time at which the display device provided feedback for this event, which again may be thought of as end-to-end latency.

Returning back to initial three functions, end-to-end latency may be broken down in two parts, (1) hardware latency; and (2) operating system and display latency. Hardware latency involves latency of touch hardware, e.g., from a moment at which the contact 202 occurred until the moment report is received by the operating system. The remainder of the latency involves the operating system and display latency. Accordingly, hardware panning latency may be expressed as follows:

$$\text{Latency}_{HW}(x,y)=\text{Report}^{-1}(x,y)-\text{Contact}^{-1}(x,y)$$

An inverse report function may be defined in a similar fashion as inverse contact and display functions above:

$$t_R=t_R(x_0,y_0)=\text{Report}^{-1}(x_0,y_0)$$

Hence, the hardware latency for any given point on the path (x0, y0) may be expressed as follows:

$$\text{Latency}_{HW}(x_0,y_0)=t_R(x_0,y_0)-t_C(x_0,y_0)=t_R-t_C$$

This equation describes the difference in time between a time at which contact 202 occurred at a given position (x0, y0) and a time at which this contact was reported to the system.

A case of panning latency measurement (e.g., hardware and/or end-to-end) may be described as follows, where:
   Contact(x,y) function is continuous
   Report(x,y) function is discrete (not continuous); and
   Display(x,y) function is discrete (not continuous), for end-to-end latency measurement.

This may be used to represent a real-world scenario in which reporting and display rates are discrete as occurring at generally fixed time intervals. Consequently, there are no changes in the actual equations used above except in domains where appropriate functions are defined.

For instance, since Report(x,y) is defined in discrete points, the inverse function exists in the same discrete points and not elsewhere. Hence, the hardware latency definition becomes:

$$\text{Latency}_{HW}(x_i,y_i)=\text{Report}^{-1}(x_i,y_i)-\text{Contact}^{-1}(x_i,y_i)$$

where $(x_i,y_i)$ represents the position of the i-th reported point. Similarly, the following end-to-end latency definition may be observed:

$$\text{Latency}(x_i,y_i)=\text{Display}^{-1}(x_i,y_i)-\text{Contact}^{-1}(x_i,y_i)$$

Thus, one way to measure latency is to obtain position and a timestamp for reported or displayed contact, then obtain a timestamp at a point in time at which the contact is located at that precise position ($\text{Contact}^{-1}(x_i,y_i)$) and calculate the difference between the two timestamps.

Constant Angular Velocity

In the previous section, a model for panning latency measurement was described. In this section, an example system is described that may be used for panning latency measurement. As described above, panning hardware latency may be measured:
   from touch report (e.g., touch POINTER message), timestamp (tR) and position of the reported touch may be obtained;
   the timestamp (tC) when contact was at the reported position may be obtained; and
   latency for this measurement may then be defined as tR−tC.

Hence, the panning latency measurement may be reduced to contact position measurement.

One way to measure the position of contact is to move the contact, e.g., around a predefined circular path 204 at constant angular velocity with one or more control points. The starting point is the path 204 of the contact 202 and since a circular motion is being used in this example the path 204 will also be circular in physical world, although not reported so in the coordinate's pixel world. Therefore, this path 204 may be defined using the following parameters:
   the center of the circle (x00, y00), e.g., in centimeters relative to a defined point; and
   the radius of the circle R, e.g., in centimeters.

These parameters are sufficient to describe the path 204.

Another way to describe the path 204 is to use parametric equations as a function of angle α:

$$\text{Pos}_x(\alpha):(\alpha) \to (x)$$

$$\text{Pos}_x(\alpha)=x(\alpha)=x_{00}+R\cos\alpha-R\sin\alpha,$$

This is correct if alpha is defined to a point on the path. If alpha is relative to x-axis, then R cos(alpha) is used.

$$\text{Pos}_y(\alpha):(\alpha) \to (y)$$

$$\text{Pos}_y(\alpha)=y(\alpha)=y_{00}+R\sin\alpha\cos\alpha$$

Similar to this, an inverse angle function may be established:

$$\text{Angle}(x, y) : (x, y) \to (\alpha)$$

$$\text{Angle}(x, y) = \alpha(x, y) = tan^{-1}\frac{y - y_{00}}{x - x_{00}}$$

where mentioned position and angle functions depend on the center and the radius of the circle.

Once the path 204 is defined, two additional parameters may be used to describe the contact position in time:
   angular velocity of the contact (ω); and
   one position of the contact in time, say as an angle in some distinct time t0 (α(t0)).

With those parameters set, the contact position in time may be defined as:

$$\text{Angle}(t):(t) \to (\alpha)$$

$$\text{Angle}(t)=\alpha(t)=\alpha(t_0)+\omega(t-t_0)$$

Panning hardware latency may be defined in terms of functions mentioned above. Values are obtained from the touch report, position of the contact ($x_i, y_i$) and timestamp $t_R$ as follows:

$$\text{Latency}(x_i, y_i, t_R) = \frac{\alpha(t_R) - \alpha(x_i, y_i)}{\omega}$$

In this section, latency is described in terms of touch report parameters $x_i, y_i$ and $t_R$. Six other parameters (x00, y00, R, $\omega$, t0, $\alpha$(t0)) of the model may be extracted prior to actual measurement, as further described in the following section Obtaining the Parameters of the Constant Angular Velocity Model Parameters of this model may be obtained from touch reports and a measurement of an actual size of a display area of the display device 106, e.g., physical size of the screen in centimeters. Thus, this model may support fully automated measurement. For the purposes of this discussion, reported positions are expressed in centimeters, although the positions may also be expressed in pixels or other units. Conversion from pixel coordinate space to physical coordinate space may be performed as follows:

$$PosX_{cm} = \frac{PosX_{pixels}}{ScreenWidth_{pixels}} ScreenWidth_{cm}$$

$$PosY_{cm} = \frac{PosY_{pixels}}{ScreenHeight_{pixels}} ScreenHeight_{cm}$$

There are numerous ways to measure and estimate each of the parameters, examples of which are described below. It should be noted that some parameters in this list may be measured independently of another.

Starting with the center of the circular path 204, one way for estimating x00 and y00 is to sum each of the values for collected reported data as described below:

$$x_{00} = \frac{1}{n}\sum_{i=1}^{n} x_i$$

$$y_{00} = \frac{1}{n}\sum_{i=1}^{n} y_i$$

The reporting rate may be assumed in this example to be the same in each part of the display area of the display device 106 and that the entire path 204 is bounded by the display area of the display device 106. In one or more implementations, full circle increments are taken into account, soley. It should be noted that estimates for x00 and y00 may be independent from one another as mentioned before.

Another estimate for x00 and y00 may be made as follows:

$$x_{00} = \frac{\min\limits_{i \leq n} x_i + \max\limits_{i \leq n} x_i}{2}$$

$$y_{00} = \frac{\min\limits_{i \leq n} y_i + \max\limits_{i \leq n} y_i}{2}$$

This estimate also assumes that the entire path is bounded by the display area of the display device 106.

Similarly, an estimate for R may be expressed as follows:

$$R = \frac{\max\limits_{i \leq n} x_i - \min\limits_{i \leq n} x_i + \max\limits_{i \leq n} y_i - \min\limits_{i \leq n} y_i}{4}$$

In another example, an estimate for R may be made using the following expression:

$$R = \sqrt{\frac{1}{n}\sum_{i=1}^{n}(x_i - x_{00})^2 + (y_i - y_{00})^2}$$

Therefore, average error for this estimate may be defined as follows:

$$e_{AV}(x_{00}, y_{00}, R) = \frac{1}{n}\sum_{i=1}^{n}\sqrt{R^2 - (x_i - x_{00})^2 - (y_i - y_{00})^2}$$

Similarly, the maximum error may be defined as follows:

$$e_{MAX}(x_{00}, y_{00}, R) = \max_{i \leq n}\sqrt{R^2 - (x_i - x_{00})^2 - (y_i - y_{00})^2}$$

Standard deviation may also be defined rather than the maximum error as defined above. Maximum error applies to each of the three parameters for the model and thus is considered robust.

In practice, the above estimates are sufficient for desired error in measurement, e.g., an error that involves a couple of pixels. In case both have failed, an iterative gradient regression may be performed on each of the three parameters x00 and y00 and R, an example of which is shown by the following function:

$$f(x_{00}, y_{00}, R) = \sum_{i=1}^{n}(R^2 - (x_i - x_{00})^2 - (y_i - y_{00})^2)^2$$

This may be performed until a satisfactory local minimum is found around points obtained with one of the two estimates above. One way to accomplish this is to solve each of the following equations for R, x00 and y00 respectively:

$$\frac{\partial}{\partial R}[f(x_{00}, y_{00}, R)] = 0$$

$$\frac{\partial}{\partial x_{00}}[f(x_{00}, y_{00}, R)] = 0$$

$$\frac{\partial}{\partial y_{00}}[f(x_{00}, y_{00}, R)] = 0$$

The solution for the first equation was already mentioned above and is repeated as follows:

$$R = g_R(x_{00}, y_{00}) = \sqrt{\frac{1}{n}\sum_{i=1}^{n}(x_i - x_{00})^2 + (y_i - y_{00})^2}$$

The solution for the remaining two functions is a root of a cubic equation, which may be declared as $g_{x00}$ and $g_{y00}$ as follows:

$$x_{00} = g_{x00}(R, y_{00})$$

$$y_{00} = g_{y00}(R, x_{00})$$

Additionally, all three may be used in a standard iterative procedure:

$$R^{(k)} = g_R(x_{00}^{(k-1)}, y_{00}^{(k-1)})$$

$$x_{00}^{(k)} = g_{x00}(R^{(k)}, y_{00}^{(k-1)})$$

$$y_{00}^{(k)} = g_{y00}(R^{(k)}, x_{00}^{(k)})$$

where $x_{00}^{(0)}$ and $y_{00}^{(0)}$ are taken from simple estimations above, with k defined as the iteration number.

Other scenarios may also be supported in which an entire path is not on the display area of the display device 106, but rather some parts to the path are outside of the display area. In such scenarios, three or more points on the path may be selected and used to calculate a center of the circumscribed circle for that triangle. An example of this is shown in the following process:

- pick a point on the path (xi, yi);
- select another point on the path (xj, yj) such that distance from the two points is maximal;
- select third point as (x(i+j)/2, y(i+j)/2);
- calculate the center of the circumscribed circle for these three points;
- repeat these steps one or more additional times, calculate average position of the center;
- calculate R using the equation above;
- calculate maximal error using the equation above;
- if the maximal error is acceptable, the process is complete; and
- if not, proceed to iterative process described above.

At this point parameters x00, y00 and R as well as maximal error of measurement for these parameters have been calculated. Three parameters remain for calculation: ω, t0, α(t0).

An assumption may be made that t0=0 and therefore time may be measured relative to this moment. The initial angle α(t0) may be calculated from the reported data $(x_i^0, y_i^0)$ at given timestamp t0=0 using the following expression:

$$\alpha(x_i^0, y_i^0) = \arctan \frac{y_i^0 - y_{00}}{x_i^0 - x_{00}}$$

This measurement may be repeated a number of times; for instance if the position of the measurement is fixed each time the average may be calculated as:

$$\alpha_{AV} = \frac{1}{k} \sum_{i=1}^{k} \alpha(x_i^0, y_i^0)$$

and the maximum error of this measurement as:

$$e_\alpha = \max_{i \le k} |\alpha(x_i^0, y_i^0) - \alpha_{AV}|$$

Angular velocity w may be measured a variety of ways. For instance, reported contact positions may be utilized by selecting points (e.g., randomly) on the path and by measuring time between two passes.

Accordingly, a process that may be performed for this measurement using reported contact positions as follows:

- select a point on the path (xi0, yi0) (e.g., randomly) and store timestamp for this point ti0;
- as path is circular, find the closest point (xi1, yi1) to (xi0, yi0) in the next cycle;
  - find a local minimum of distance function between (xi0, yi0) and (xi, yi), e.g. locate (xi1−1, yi1−1), (xi1, yi1) and (xi1+1, yi1+1) such that d(i1−1, i0)>d(i1, i0) and d(i1+1, i0)>=d(i1, i0)
- interpolate timestamps ti1−1, ti1, ti1+1, in order to get the best estimate $t_{i1}^*$;
- angular velocity may then be expressed as:

$$\omega_1 = \frac{2\pi}{t_{i1}^* - t_{i0}}$$

or in general for the k-th cycle:

$$\omega_k = \frac{2\pi}{t_{ik}^* - t_{i(k-1)}}$$

Average angular velocity and maximum error may then be defined for this measurement.

Figure 3:
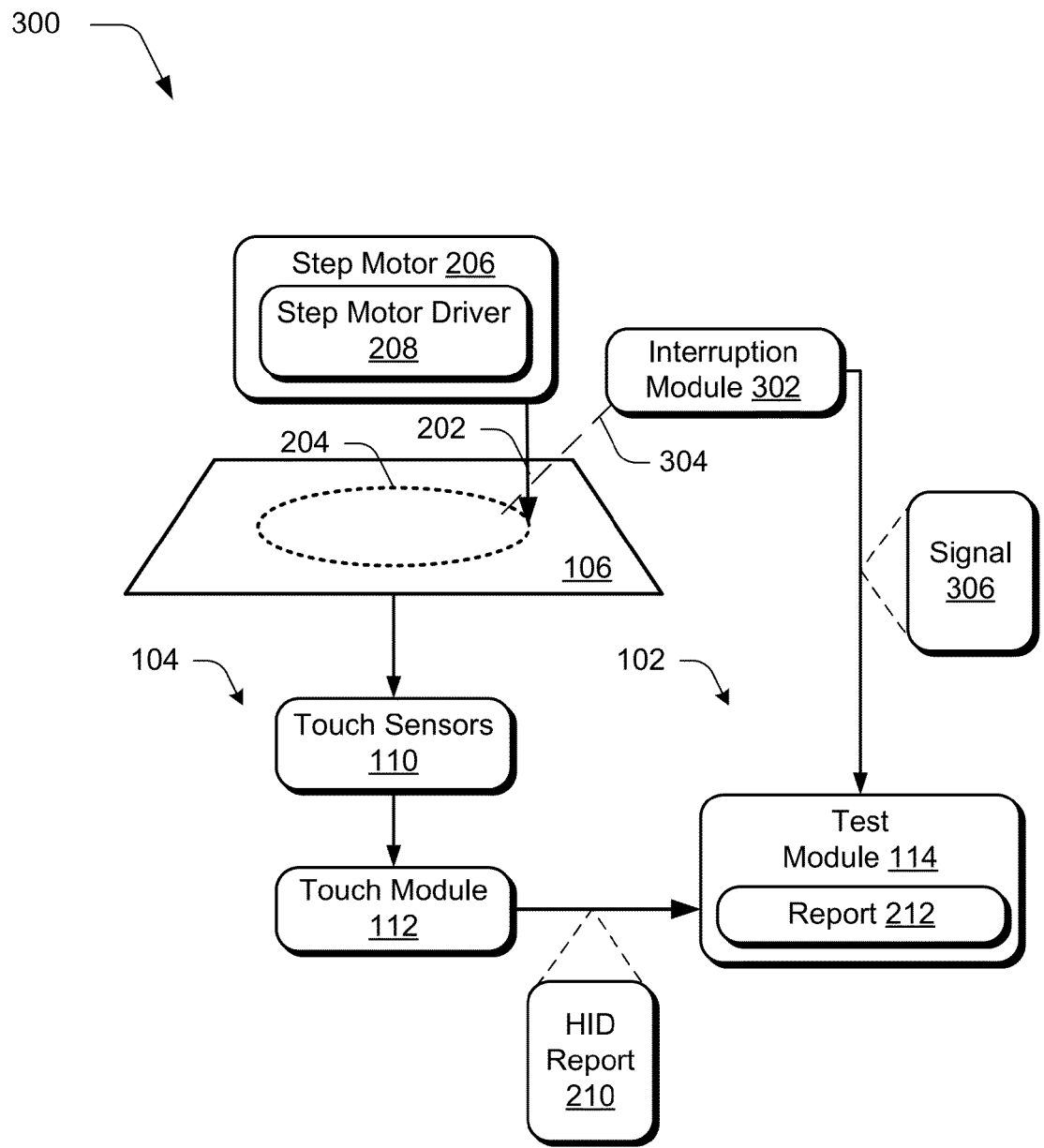
FIG. 3 depicts an example system in which a test apparatus of FIG. 1 is configured to perform panning latency measure using an interruption.
Figure 4:
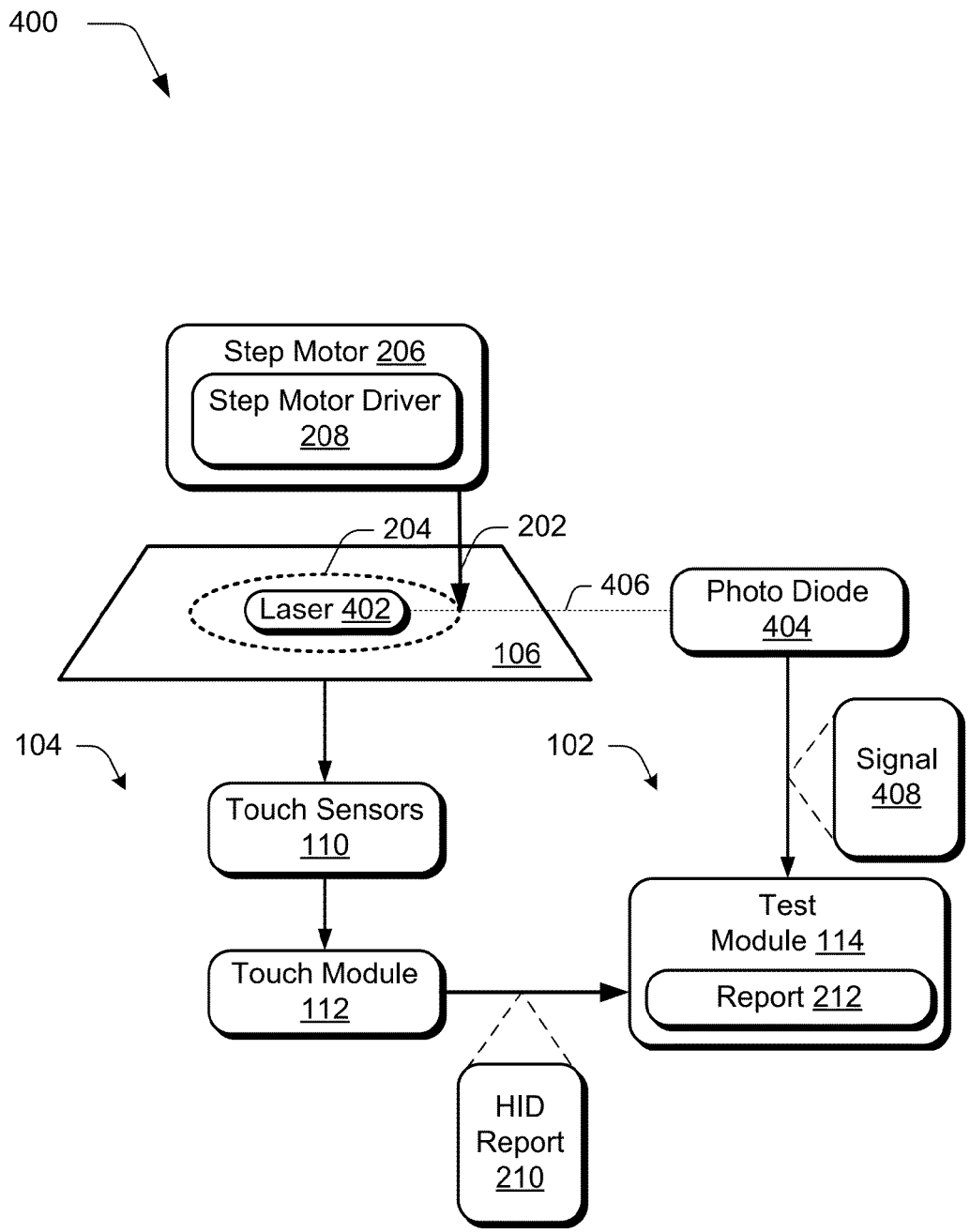
FIG. 4 depicts an example system in which a test apparatus of FIG. 1 is configured to perform panning latency measure using a laser.

An alternative is to have a separate device that is configured to report back to the system at the moment contact is achieved at some predefined (but effectively arbitrary) position, examples of which are shown and described in relation to FIGS. 3 and 4. This may reduce the complexity of the problem by using fixed timestamps tk. In this case, each measurement for angular velocity becomes:

$$\omega_k = \frac{2\pi}{t_k - t_{k-1}}$$

The average angular velocity is then expressed as:

$$\omega_{AV} = \frac{1}{n} \sum_{k=1}^{n} \omega_k$$

and maximal error expressed as the following:

$$e_\omega = \max_{k \le n} |\omega_k - \omega_{AV}|$$

Hardware Setup for Panning Latency Measurement with Step Motor

In this example, a solution that leverages constant angular velocity is used. In the illustrated system, a step motor 206 is used to achieve constant angular velocity, e.g., which may provide approximately one millisecond accuracy. The system may include a variety of different parts, such as:

- Leveling surface, used to appropriately level a device under test, such as the display device 106;

Step motor holder, used to hold the step motor 206 above the leveling surface;

Step motor 206;

Step motor driver 208, e.g., a spate box with a control program driving the step motor 206 via a serial port or other communicative connection;

Mount for the contact 202 (e.g., touch stick or pen);

Components to detect the moment when contact is located at control point, examples of which are shown in FIGS. 3 and 4; and A software component to drive and automate the procedure, which may be implemented as part of the test module 114.

Leveling may be performed simply by lowering the contact 202 (e.g., the touch stick) until it reaches the surface of the device under test, e.g., the display device 106. The step motor 206 may then be moved at a low angular velocity to verify the contact along the path 204. This may be tested by starting the step motor 206 at nominal angular velocity (e.g., ~3 rad/s) and verifying that reported touch events are consistent:

Stable report rate equal to the maximum reporting rate of the device; and

Stable contact id, contact id does not change for a couple of cycles on average.

Once the two conditions are met, the display device 106 is considered leveled.

Panning Latency Measurement with Step Motor

Four distinct phases of the panning latency measurement process may be differentiated:

Setup (leveling, ensuring that contact 202 is firm and produces uninterrupted touch reports);

Calibration (detect positions of the control points based on collected data);

Acquisition (detect center of the circle, radius, and angular velocity based on collected data); and Collection (measure panning latency based on collected data).

In the first stage, leveling is ensured to be appropriate as described above, e.g. contact is firm and yield solid uninterrupted touch reports for at least a complete circle. In the second stage, calibration, the position of the control points (x11, y11) and (x22, y22) are detected. These are locations of the reported touch/pen contacts used to calculate $\alpha(t0)$. One way to accomplish this is to have step motor 206 move the contact 202 at a low angular velocity, e.g., $\omega=0.03$ rad/s, compared to a default nominal working angular velocity of $\omega=3$ rad/s.

In the third stage, the parameters of the path are detected along with the center of the circle and the radius, as well as angular velocity. This may be performed at working velocities, e.g., $\omega=3$ rad/s. Each of the reported samples are acquired and processed to determine these parameters. Error estimates are calculated based on the acquired data and obtained parameters.

Finally in the fourth stage the reported contacts and reported timestamps are collected. Previously obtained parameters of the model are used to measure panning latency. Panning latency may be computed for each reported point, which may be processed with respect to the model presented below to generate the report 212.

Example Panning Latency Measurement Using Interruptions

FIG. 3 depicts an example system 300 in which the test apparatus 102 is configured to perform panning latency measurement using an interruption. As before, the device under test includes a display device 106 having sensors 110 and a touch module 112. The test apparatus 102 includes a contact 202 that is moved along a path by a step motor 206 and controlled by a step motor driver 208. In this example, however, the test apparatus 102 further includes an interruption module 302, which may include a photo interrupter circuit to detect a moment at which a contact 202 for the step motor 206 passes a control point, which may correspond to an angle of rotation for step motor $\alpha0$ that is to be established.

A photo interrupter circuit of the interruption module 302 may include a light-emitting device (e.g., LED) and photo diode placed such that the LED emits focused light 304 (e.g., outside of the visible spectrum) towards the photo diode. The photo diode is configured to receive this focused light, e.g., which may include a lens is used to focus the beam, a groove to further obscure influence of the ambient light, and so on. Consequently, when an opaque object such as the contact 202 or other device connected to the step motor 206 (e.g., a needle) enters the space between LED and photo diode, the photo interrupter circuit reports a signal 306 to the test module 114. This detection may be used to estimate an angular position of the step motor 206 at the moment of interruption.

The interruption module 302 may add four additional components to the system 200 of FIG. 2. These components may include a needle is attached to the moving part of the step motor that is configured to initiate the photo interrupter circuit. The photo interrupter circuit may be placed on the fixed part of the step motor 206, e.g., the holder, and positioned in a such way that needle interrupts the optical beam between two parts of the photo interrupter, e.g., the light 304. Additionally, the interruption module 302 may be configured to include a microcontroller that is to receive an input from the photo interrupter circuit, record a timestamp of this event, and report this timestamp back to the test module 114. The microcontroller may be programmed to detect both rising and falling edge of the photo interrupter signal, allowing an accurate estimate for error in measurement to be established.

Once an event timestamp is received by the test module 114 (e.g., with less than 1 ms latency), a time of the event may be estimated and further used to reduce the error in measurement below 0.5 ms. This information may be later used to estimate actual physical position of the contact 202 at any given time and thus may be used to measure panning latency.

As before, the measurement process may be divided conceptually into four stages, setup, calibration, acquisition, and collection. Setup may be performed as previously described in relation to FIG. 2. For calibration, relatively low angular velocities may be used initially to detect reported positions of the contact 202 when a signal 306 from the interruption module 302 is received. The interruption module 302 may be configured to report two signals per interruption. Expected time between signals (e.g., rising and falling) may be estimated using the following expression:

$$\Delta_{signal} = \Delta_{needle}/R\omega_{low}$$

This expression is a good estimation when $R >> d_{needle}$. For default values of one millimeter for needle thickness, 0.03 rad/s for low angular velocity and 4.5 cm for radius, an expected amount time between signals is approximately 740 ms.

Reported positions ($x_i^o$ and $y_i^o$) may be collected around the time a signal 306 is received from the interruption module 302, which may then be interpolated to achieve an estimate to address occurrence of touch reports at different times than a photo interrupter signal. As a result, the position ($x_{AV}^o, y_{AV}^o$) of the contact 202 reported by the display device 106 may be obtained when rising edge of the photo interrupter signal is reported. Results of the falling edge measurement may be used to increase reliability and confidence. An error in measurement (defined as maximal error in measurement) may be calculated as follows:

$$e_x^0 = \max_{i \leq k} |x_i^0 - x_{AV}^0|$$

$$e_y^0 = \max_{i \leq k} |y_i^0 - y_{AV}^0|$$

Error as described above is usually a result of inaccuracies of the digitizer, however it may still be involved as part of error analysis.

For acquisition, properties of the path and angular velocity may be detected as follows. First, reported positions may be recorded for a plurality of cycles, which may or may not be complete, e.g., part of the circle may occur "off screen."

Once recording is finished, estimates for the center of the circle ($x_{00}, y_{00}$) and the radius R may be calculated, e.g., a "best estimate" as described above. For example, the error of this estimate may be expressed as:

$$e_{AV}(x_{00}, y_{00}, R) = \frac{1}{n} \sum_{i=1}^{n} \sqrt{R^2 - (x_i - x_{00})^2 - (y_i - y_{00})^2}$$

$$e_{MAX}(x_{00}, y_{00}, R) = \max_{i \leq n} \sqrt{R^2 - (x_i - x_{00})^2 - (y_i - y_{00})^2}$$

In one or more implementations, average error is targeted to be in the order of one pixel which maximum error not significantly different.

Angular velocity may be estimated using the reported timestamps of the photo interrupter rising signals. For each two consecutive reported rising edges, an angular velocity estimate may be defined as:

$$\omega_k = \frac{2\pi}{t_k - t_{k-1}}$$

Once recording is finished, an average for angular velocity may be defined as:

$$\omega_{AV} = \frac{1}{n} \sum_{k=1}^{n} \omega_k$$

Finally, an error in measurement may be defined as:

$$e_\omega = \max_{k \leq n} |\omega_k - \omega_{AV}|$$

After collection, panning latency for each reported touch position may be calculated. With the previous two stages, parameters of the model have been established and hence for each reported point latency may be calculated as:

$$\text{Latency}(x_i, y, t_R) = \frac{\alpha(t_R) - \alpha(x_i, y_i)}{\omega}$$

where $$\alpha(t_R) = \alpha(0) + \omega t_R = \arctan \frac{y_i^0 - y_{00}}{x_i^0 - x_{00}} + \omega t_R$$

$$\alpha(x_i, y_i) = \arctan \frac{y_i - y_{00}}{x_i - x_{00}}$$

As previously mentioned, coordinates are in centimeters and not pixels in these examples although pixels and other units of measurement are also contemplated. It should also be noted that latency is independent on R value.

The error in measurement may be expressed as follows:

$$\delta_{\text{Latency}(x_i, y_i, t_R)} =$$

$$\left| \frac{\partial \text{Latency}}{\partial x_i^0} \right| |\delta x_i^0| + \left| \frac{\partial \text{Latency}}{\partial y_i^0} \right| |\delta y_i^0| + \left| \frac{\partial \text{Latency}}{\partial \omega} \right| |\delta \omega| + \left| \frac{\partial \text{Latency}}{\partial t_R} \right| |\delta t_R| +$$

$$\left| \frac{\partial \text{Latency}}{\partial x_{00}} \right| |\delta x_{00}| + \left| \frac{\partial \text{Latency}}{\partial y_{00}} \right| |\delta y_{00}| + \left| \frac{\partial \text{Latency}}{\partial x_i} \right| |\delta x_i| + \left| \frac{\partial \text{Latency}}{\partial y_i} \right| |\delta y_i|$$

where upper limits may be directly applied and partial derivatives may be either explicitly calculated or numerically estimated.

A plurality of cycles (e.g., e.g., several dozen) may be performed to store reported positions and timestamps $x_i, y_i, t_R$. These values may then be used to calculate latency. Once latency is calculated, a distribution function may be built over each of the examples and a mean latency extracted from this distribution. This step can be used as a final check point, as a normal Gaussian distribution is expected as a result of this process.

Error Estimate

In the previous example of FIG. 2, the error estimate for the latency may be expressed as follows:

$$\delta_{\text{Latency}(x_i, y_i, t_R)} =$$

$$\left| \frac{\partial \text{Latency}}{\partial x_i^0} \right| |\delta x_i^0| + \left| \frac{\partial \text{Latency}}{\partial y_i^0} \right| |\delta y_i^0| + \left| \frac{\partial \text{Latency}}{\partial \omega} \right| |\delta \omega| + \left| \frac{\partial \text{Latency}}{\partial t_R} \right| |\delta t_R| +$$

$$\left| \frac{\partial \text{Latency}}{\partial x_{00}} \right| |\delta x_{00}| + \left| \frac{\partial \text{Latency}}{\partial y_{00}} \right| |\delta y_{00}| + \left| \frac{\partial \text{Latency}}{\partial x_i} \right| |\delta x_i| + \left| \frac{\partial \text{Latency}}{\partial y_i} \right| |\delta y_i|$$

This may be broken down into the following pieces and used to provide upper estimates:

$$\delta x_i = \frac{\text{ScreenWidth}_{cm}}{2 * \text{ScreenWidth}_{pixels}}$$

$$\delta y_i = \frac{\text{ScreenHeight}_{cm}}{2 * \text{ScreenHeight}_{pixels}}$$

$$\delta t_R = 0.5 \text{ ms}$$

$$\delta x_i^0 = \max\{e_x^0, \delta x_i\} = \max\left\{\max_{i \leq k} |x_i^0 - x_{AV}^0|, \frac{\text{ScreenWidth}_{cm}}{2 * \text{ScreenWidth}_{pixels}}\right\}$$

$$\delta y_i^0 = \max\{e_y^0, \delta y_i\} = \max\left\{\max_{i \leq k} |y_i^0 - y_{AV}^0|, \frac{\text{ScreenHeight}_{cm}}{2 * \text{ScreenHeight}_{pixels}}\right\}$$

$$\delta \omega = \max\left\{e_\omega, \frac{2 * \delta t_R}{\omega^2}\right\} = \max\left\{\max_{k \leq n} |\omega_k - \omega_{AV}|, \frac{2 * \delta t_R}{\omega^2}\right\}$$

$$\delta x_{00} = \max\{e_{MAX}(x_{00}, y_{00}, R), \delta x_i\} =$$

$$\max\left\{\max_{i \leq n} \sqrt{R^2 - (x_i - x_{00})^2 - (y_i - y_{00})^2}, \frac{\text{ScreenWidth}_{cm}}{2 * \text{ScreenWidth}_{pixels}}\right\}$$

-continued $$\delta y_{00} = \max\{e_{MAX}(x_{00}, y_{00}, R), \delta y_i\} =$$

$$\max\left\{\max_{i \leq n} \sqrt{R^2 - (x_i - x_{00})^2 - (y_i - y_{00})^2}, \frac{ScreenHeight_{cm}}{2 * ScreenHeight_{pixels}}\right\}$$

The upper error estimates as proposed above are either coming as a result of direct error in measurement (the first three: $\delta x_i$, $\delta y_i$, and $\delta t_R$) or are a derived from more complex indirect measurements. This is because the latter three ($\delta \omega$, $\delta x_{00}$, and $\delta y_{00}$) and more particularly the middle two ($\delta x_i^0$ and $\delta y_i^0$) fall in between two categories as measurements of those made directly. Expectations for $\delta x_i^0$ and $\delta y_i^0$ may be defined in which both parts of the error are roughly the same ($e_x \sim \delta x_i$ and $e_y \sim \delta y_i$), which is an indication of confident measurement and acceptable response of the sensors 110. In case $e_x \gg \delta x_i$, the sensors 110 (which may be independently verified) or the entire setup (e.g., systematic errors) may be blamed. In case $e_x \ll \delta x_i$, this may involve a false indication of the accuracy in measurement.

Example Panning Latency Measurement Using a Laser

FIG. 4 depicts an example system 400 in which the test apparatus 102 is configured to perform panning latency measure using a laser. As before, the device under test includes a display device 106 having sensors 110 and a touch module 112. The test apparatus 102 includes a contact 202 that is moved along a path by a step motor 206 and controlled by a step motor driver 208. In this example, however, the test apparatus 102 further includes a laser 402 (e.g., class IIIA laser) and a photo diode 404 (e.g., inverse polarized photo diode and 1MΩ resistor) to detect a moment at which a contact 202 for the step motor 206 passes a control point. In one or more implementations, a sensing area of the photo diode 404 may be reduced, such as to use an opaque tape having a hole sized to provide desired sensitivity, e.g., hole diameter less than 0.5 mm.

The laser 402 and photo diode 406 may be placed in a variety of ways to detect movement of the contact 202. As illustrated, for instance, the laser 402 may be placed on a surface of the display device 106 under test such that contact 202 interrupts the laser beam 306 when it passes in front of it. In this way, a position and timestamp of the contact 202 may be accurately determined at this control point. This technique may be combined with the step motor 206 approach discussed previously in relation to FIG. 2. In another example, the laser 402 may be placed outside the path 204 such that the contact 202 passes through the laser beam 406 twice when moving along the path 204. A variety of other examples are also contemplated.

In the first solution, a single control point is leveraged, while in the second solution two control points may be leveraged. The control points may be differentiated from each other in the acquisition and collection stage, e.g., which may include "ignoring" the second control point that is further away and "keeping" the first control point that is closest to the photo diode 404. One way to accomplish this is to calculate the distance from the last reported position to both control points, which may be established during calibration. A simple criterion may include ignore the reported control point if last reported position is closer to the second (farther) control position.

This criterion will work for angular velocities and relative low latencies. A threshold angular velocity value for a device that exhibits "poor" panning latency (e.g., panning latency ~100 ms), whereas target panning latency may be set around 15 ms. Threshold angular velocity may be defined using the following expression:

$$\omega_{threshold} = \frac{\pi}{latency}$$

For the example above, the threshold angular velocity is approximately 31.42 rad/s, which is ten times more than target nominal angular velocity, hence this approach is sufficient for this example.

Another way to differentiate between the two reported control points can also be devised if laser beam 404 does not go through the center of the path 204. In this case, a timestamp of the reported control point may be used to differentiate between the two. A criterion then becomes ignore the reported control point if time between last two consecutive reported control points is smaller than the time of the previous two consecutive reported control points. With these two criteria, the problem of placement of laser 402 and photo diode 404 has been reduced to a single control point, although other examples are also contemplated.

The test module 114 may receive a signal 408 from the photo diode and record the timestamp of this event. The test module 114 may be configured to detect both rising and falling edge of the photo diode 404 signal 408, allowing an accurate estimate for error in measurement.

The test module 114 may then be configured to estimate a time the event occurred based on the event timestamp (e.g., with less than 1 ms latency) and further reduce the error in measurement to below 0.5 ms. This information may be used to estimate actual physical position of the contact 202 at any given time, which may be used to measure panning latency.

The system 400 may include components as previously described, such as the contact 202, step motor 206, step motor driver 208, a leveling surface, test module 114, and so on. Further, the measurement may also be divided into stages as previously described, such as to setup the laser 402, calibration, measurement, and so on.

In regards to calibration and detection of position of control points based on collected data, low angular velocities may be used to detect reported position of the contact 202 when the signal 408 from the photo diode 404 is received. The photo diode, for instance, may report two signals per interruption. An expected time between signals (rising and falling) may be estimated with:

$$\Delta_{signal} = d_{stick/pen}/R\omega_{low}$$

As before, this equation provides a good estimate when R≫contact 202. For default values of 8 mm for contact 202 thickness, 0.03 rad/s for low angular velocity and 4.5 cm for radius of the path 204, an expected time between signals is approximately 5926 ms. This measurement may be repeated, e.g., a dozen times, more than 35 times if absolute maximal error is more than one pixel, and so on.

The reported positions ($x_i^0$ and $y_i^0$) are recorded around the time the signal 408 is received from the photo diode. The recorded positions may be interpolated to arrive at an estimate, e.g., as touch reports may not occur at the same time as the photo diode 404 signal 408.

As a result, the reported position (by a digitizer of the display device 106) ($x_{AV}^0$, $y_{AV}^0$) of the contact 202 when rising edge of the photo diode 404 signal 408 is obtained. Results of the falling edge measurement may be used to increase reliability and confidence as previously described in relation to FIG. 3.

An error in measurement (defined as maximal error in measurement) may be calculated as follows:

$$e_x^0 = \max_{i \le k} |x_i^0 - x_{AV}^0|$$

$$e_y^0 = \max_{i \le k} |y_i^0 - y_{AV}^0|$$

Error as described above is expected to be more significant than the actual methodological error in measurement (which comes as a result of latency introduced by the microcontroller) in the current example, however both are considered in the later error analysis described below.

Regarding acquisition and detection of properties of the path and angular velocity, this may be accomplished by recording reported positions for several cycles, e.g., a dozen or more as previously described. As described in relation to FIG. 3, cycles may be incomplete, e.g. a part of the cycle contacts the display device 106 while another part does not. Once recording is finished, the best estimates for the center of the circle ($x_{00}$,$y_{00}$) and the radius R may be calculated as also previously described. The error of this estimate is may be expressed as follows:

$$e_{AV}(x_{00}, y_{00}, R) = \frac{1}{n}\sum_{i=1}^{n}\sqrt{R^2 - (x_i - x_{00})^2 - (y_i - y_{00})^2}$$

$$e_{MAX}(x_{00}, y_{00}, R) = \max_{i \le n}\sqrt{R^2 - (x_i - x_{00})^2 - (y_i - y_{00})^2}$$

In one or more implementations, average error is targeted to be in the order of one pixel and maximum error is not significantly different.

Angular velocity is estimated by using the reported timestamps of the photo diode rising signals. For each two consecutive reported rising edges, an angular velocity estimate may be defined as:

$$\omega_k = \frac{2\pi}{t_k - t_{k-1}}$$

Once recording is finished, an average for angular velocity may be defined as:

$$\omega_{AV} = \frac{1}{n}\sum_{k=1}^{n}\omega_k$$

Thus, an error in measurement may be defined as:

$$e_\omega = \max_{k \le n}|\omega_k - \omega_{AV}|$$

collection, calculate panning latency for each reported touch position

With the previous two stages, parameters of the model have been established and hence for each reported point latency may be calculated as:

$$\text{Latency}(x_i, y, t_R) = \frac{\alpha(t_R) - \alpha(x_i, y_i)}{\omega}$$

where $$\alpha(t_R) = \alpha(0) + \omega t_R = \arctan\frac{y_i^0 - y_{00}}{x_i^0 - x_{00}} + \omega t_R$$

$$\alpha(x_i, y_i) = \arctan\frac{y_i - y_{00}}{x_i - x_{00}}$$

Again, as previously mentioned, the coordinates in this example are expressed in centimeters but other units are also contemplated, such as pixels. As also mentioned, latency is independent of R value.

The error in measurement may be expressed as follows:

$$\delta_{\text{Latency}(x_i,y_i,t_R)} =$$

$$\left|\frac{\partial \text{Latency}}{\partial x_i^0}\right||\delta x_i^0| + \left|\frac{\partial \text{Latency}}{\partial y_i^0}\right||\delta y_i^0| + \left|\frac{\partial \text{Latency}}{\partial \omega}\right||\delta \omega| + \left|\frac{\partial \text{Latency}}{\partial t_R}\right||\delta t_R| +$$

$$\left|\frac{\partial \text{Latency}}{\partial x_{00}}\right||\delta x_{00}| + \left|\frac{\partial \text{Latency}}{\partial y_{00}}\right||\delta y_{00}| + \left|\frac{\partial \text{Latency}}{\partial x_i}\right||\delta x_i| + \left|\frac{\partial \text{Latency}}{\partial y_i}\right||\delta y_i|$$

where upper limits are directly applied and partial derivatives may be either explicitly calculated or numerically estimated.

A plurality of cycles may be recorded, with reported positions and timestamps $x_i, y_i, t_R$ stored. Those values may then be used to calculate latency. Once the latency is calculated, a distribution function may be built over each and mean latency may be extracted from this distribution. This step can be used as a check point, as a normal Gaussian distribution is expected as a result of this process.

In the previous discussion, the error estimate for the latency is expressed as follows:

$$\delta_{\text{Latency}(x_i,y_i,t_R)} =$$

$$\left|\frac{\partial \text{Latency}}{\partial x_i^0}\right||\delta x_i^0| + \left|\frac{\partial \text{Latency}}{\partial y_i^0}\right||\delta y_i^0| + \left|\frac{\partial \text{Latency}}{\partial \omega}\right||\delta \omega| + \left|\frac{\partial \text{Latency}}{\partial t_R}\right||\delta t_R| +$$

$$\left|\frac{\partial \text{Latency}}{\partial x_{00}}\right||\delta x_{00}| + \left|\frac{\partial \text{Latency}}{\partial y_{00}}\right||\delta y_{00}| + \left|\frac{\partial \text{Latency}}{\partial x_i}\right||\delta x_i| + \left|\frac{\partial \text{Latency}}{\partial y_i}\right||\delta y_i|$$

This may be broken down into pieces as before to provide upper estimates:

$$\delta x_i = \frac{\text{ScreenWidth}_{cm}}{2 * \text{ScreenWidth}_{pixels}}$$

$$\delta y_i = \frac{\text{ScreenHeight}_{cm}}{2 * \text{ScreenHeight}_{pixels}}$$

$$\delta t_R = 0.5 \text{ ms}$$

$$\delta x_i^0 = \max\{e_x^0, \delta x_i\} = \max\left\{\max_{i \le k}|x_i^0 - x_{AV}^0|, \frac{\text{ScreenWidth}_{cm}}{2 * \text{ScreenWidth}_{pixels}}\right\}$$

$$\delta y_i^0 = \max\{e_y^0, \delta y_i\} = \max\left\{\max_{i \le k}|y_i^0 - y_{AV}^0|, \frac{\text{ScreenHeight}_{cm}}{2 * \text{ScreenHeight}_{pixels}}\right\}$$

$$\delta \omega = \max\left\{e_\omega, \frac{2 * \delta t_R}{\omega^2}\right\} = \max\left\{\max_{k \le n}|\omega_k - \omega_{AV}|, \frac{2 * \delta t_R}{\omega^2}\right\}$$

$$\delta x_{00} = \max\{e_{MAX}(x_{00}, y_{00}, R), \delta x_i\} =$$

$$\max\left\{\max_{i \le n}\sqrt{R^2 - (x_i - x_{00})^2 - (y_i - y_{00})^2}, \frac{\text{ScreenWidth}_{cm}}{2 * \text{ScreenWidth}_{pixels}}\right\}$$

-continued $$\delta y_{00} = \max\{e_{MAX}(x_{00}, y_{00}, R), \delta y_i\} =$$
$$\max\left\{\max_{i \leq n} \sqrt{R^2 - (x_i - x_{00})^2 - (y_i - y_{00})^2}, \frac{ScreenHeight_{cm}}{2 * ScreenHeight_{pixels}}\right\}$$

The upper error estimates as proposed above are a result of direct error in measurement (e.g., the first three: $\delta x_i$, $\delta y_i$, and $\delta t_R$) or are a derived from indirect measurements (e.g., as the latter three: $\delta \omega$, $\delta \omega_{00}$, and $\delta y_{00}$). The middle two ($\delta x_i^0$ and $\delta y_i^0$) fall in between two categories, as these are measured directly but the measurement may be repeated a number of times. Expectations for $\delta x_i^0$ and $\delta y_i^0$ may be made that both parts of the error are generally the same ($e_x \sim \delta x_i$ and $e_y \sim \delta y_i$), which is an indication of confident measurement and desirability in the operation of the display device 106, e.g., a touch digitizer of the display device. In case $e_x \gg \delta x_i$, this may be caused by the display device 106, which can be independently verified. This may also be caused through systemic errors. In case $e_x \ll \delta x_i$, a false indication may be obtained in the accuracy in measurement.

Example Procedures

The following discussion describes panning latency measurement techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200-400 of FIGS. 2-4, respectively.

Figure 5:
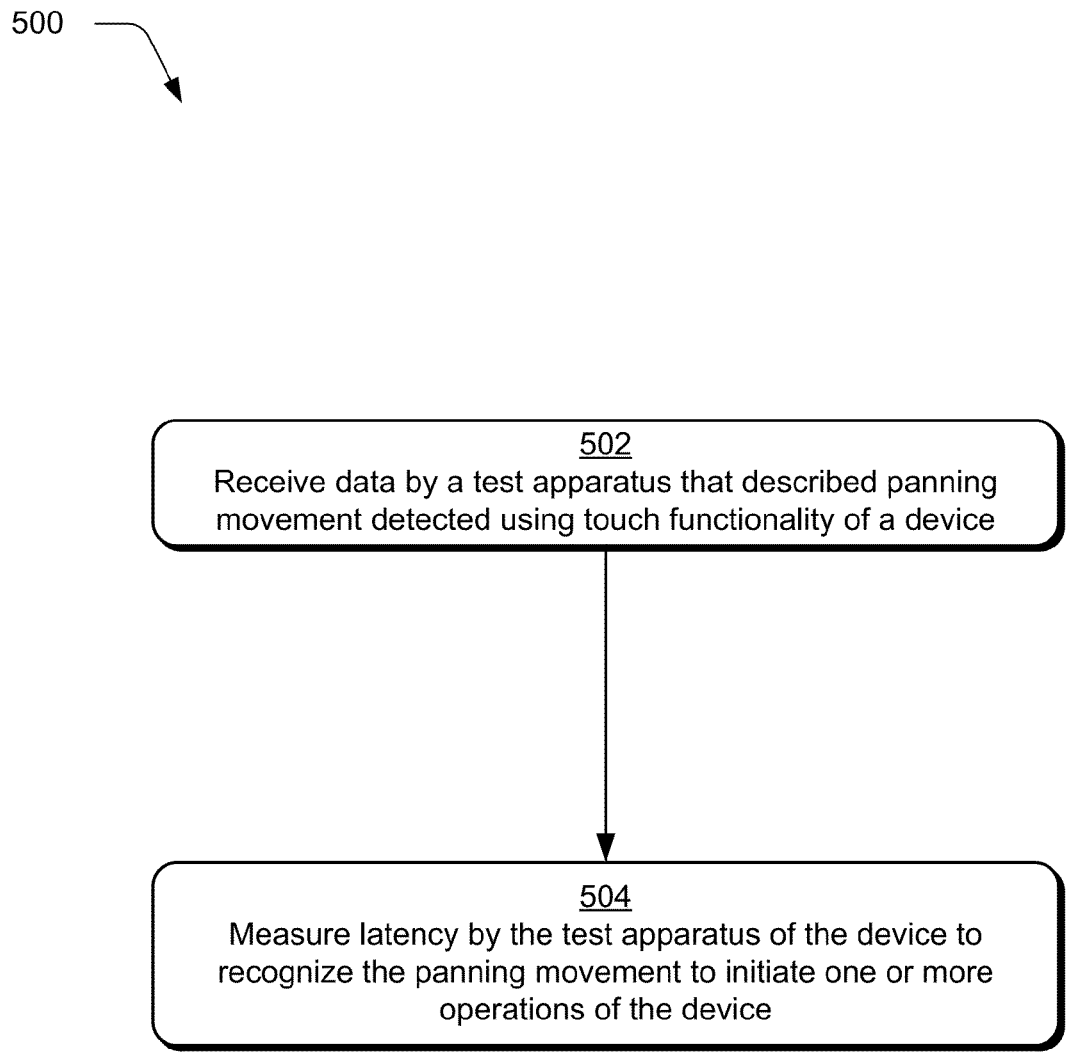
FIG. 5 is a flow diagram depicting a procedure in an example implementation in which latency is measured.

FIG. 5 depicts a procedure 500 in an example implementation in which latency is measured of a device in recognizing movement. Data is received by a test apparatus that describes panning movement detected using touch functionality of a device (block 502). A device under test, for instance, may provide an output to the test module 114, such as an HID report 210 that describes recognition by the device 106 of the panning movement.

Latency is measured, by the test apparatus, of the device to recognize the panning movement to initiate one or more operations of the device (block 504). A variety of different types of latency may be measured as previously described, such as hardware latency, end-to-end latency, and so on. A variety of other examples are also contemplated, such as an example in which the contact is provided manually by a user, e.g., by following a display of an object across the display device 106.

Example System and Device

Figure 6:
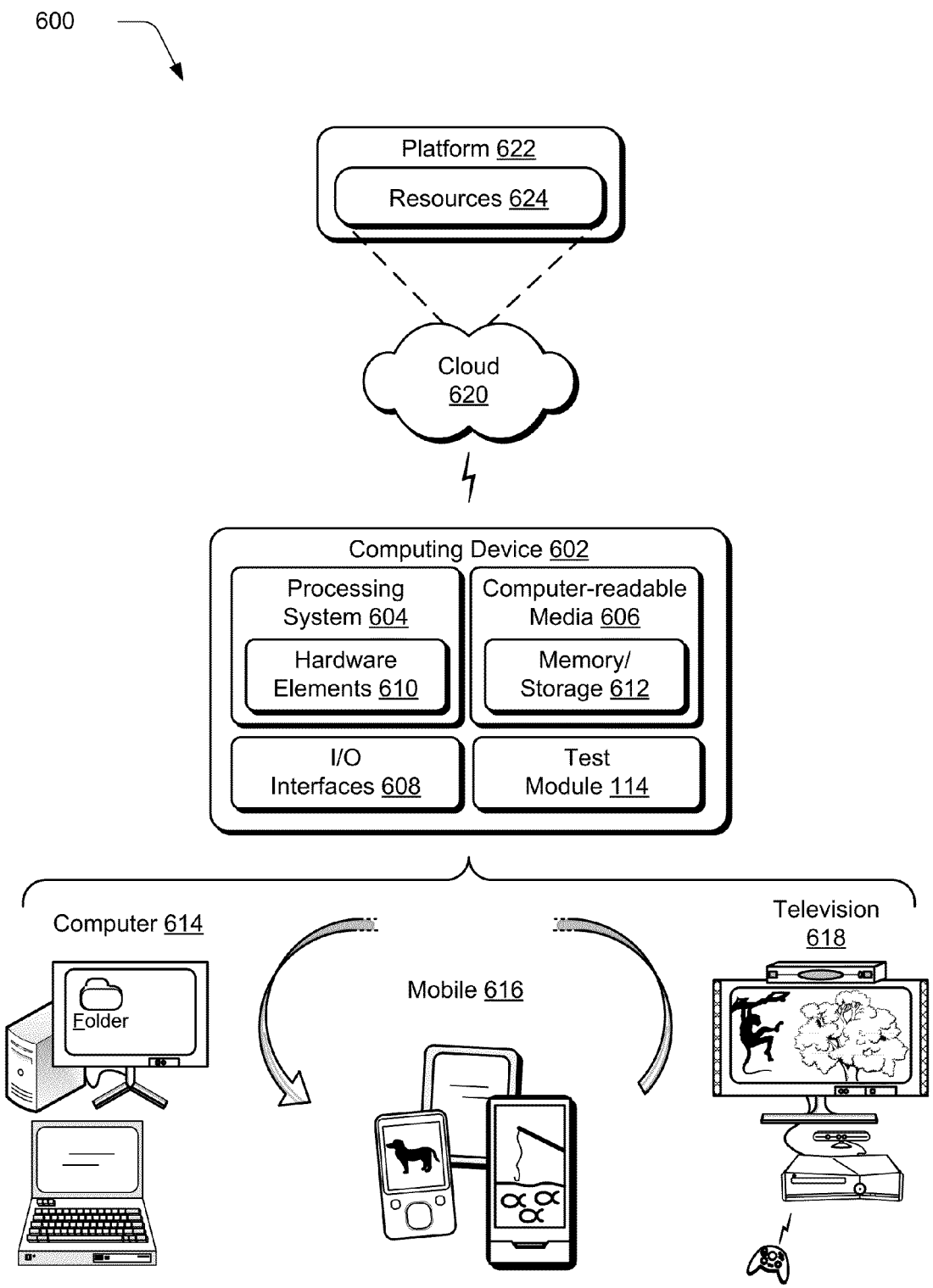
FIG. 6 illustrates an example system including various components of an example device that can be implemented as any type of computing device as described with reference to FIGS. 1-4 to implement embodiments of the techniques described herein.

FIG. 6 illustrates an example system generally at 600 that includes an example computing device 602 that is representative of one or more computing systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein in relation to the test module 114 and even the device under test may be supported by these various configurations of the computing device 602 and are not limited to the specific examples of the techniques described herein. This functionality of the test module 114 may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A test apparatus comprising:
one or more motors configured to move one or more contacts at least proximal to one or more sensors of a device to be detectable as movement; and
one or more modules implemented at least partially in hardware to measure latency of the device to recognize the movement of the one or more contacts.

2. A test apparatus as described in claim 1, wherein the one or more modules are configured to measure the latency as hardware latency of the device in recognizing the movement.

3. A test apparatus as described in claim 1, wherein the one or more modules are configured to measure the latency as end-to-end latency of the device in recognizing the movement.

4. A test apparatus as described in claim 1, wherein the one or more motors are configured as a step motor.

5. A test apparatus as described in claim 4, wherein the step motor is configured to move the one or more contacts to form a circular path, at least a portion of which is detectable by the one or more sensors of the device.

6. A test apparatus as described in claim 1, wherein the one or more modules are configured to measure the latency of the device in recognizing the movement through use of constant angular velocity.

7. A test apparatus as described in claim 1, wherein the one or more sensors of the device are configured to detect the one or more contacts as at least proximal through configuration as a touch sensor, infrared sensor, optical imaging sensor, dispersive signal sensor, sensor in pixel, resistive sensor, or acoustic pulse recognition sensor.

8. A test apparatus as described in claim 1, wherein the one or more modules include an interruption module having a photo interrupter circuit configured to detect position of the one or more contacts, which is used at least in part to measure the latency.

9. A test apparatus as described in claim 8, wherein the interruption module is configured to detect when the one or more contacts passes a control point to determine an angle of rotation for the contact by the one or more motors.

10. A test apparatus as described in claim 1, further comprising a laser and a photo diode that is configured to detect when the one or more contacts passes between the laser and the photo diode, which is used at least in part to measure the latency.

11. A method comprising:
moving one or more contacts, by one or more motors, at least proximal to one or more sensors of a device to be detectable as movement; and
measuring latency of the device to recognize the movement of the one or more contacts by one or more modules implemented at least partially in hardware.

12. A method as described in claim 11, wherein the one or more motors are configured as a step motor.

13. A method as described in claim 12, wherein the step motor is configured to move the one or more contacts to form a circular path, at least a portion of which is detectable by the one or more sensors of the device.

14. A method as described in claim 11, wherein the one or more modules include an interruption module having a photo interrupter circuit configured to detect position of the one or more contacts, which is used at least in part to measure the latency.

15. A method as described in claim 14, wherein the interruption module is configured to detect when the one or more contacts passes a control point to determine an angle of rotation for the contact by the one or more motors.

16. A method as described in claim 11, wherein the one or more modules are configured to measure the latency as hardware latency of the device in recognizing the movement.

17. A method as described in claim 11, wherein the one or more modules are configured to measure the latency as end-to-end latency of the device in recognizing the movement.

18. A method as described in claim 11, wherein the one or more modules are configured to measure the latency of the device in recognizing the movement through use of constant angular velocity.

19. A method as described in claim 11, wherein the one or more sensors of the device are configured to detect the one or more contacts as at least proximal through configuration as a touch sensor, infrared sensor, optical imaging sensor, dispersive signal sensor, sensor in pixel, resistive sensor, or acoustic pulse recognition sensor.

20. A method as described in claim 11, further comprising a laser and a photo diode that is configured to detect when the one or more contacts passes between the laser and the photo diode, which is used at least in part to measure the latency.

* * * * *